(12) United States Patent
Amin et al.

(10) Patent No.: US 7,577,940 B2
(45) Date of Patent: *Aug. 18, 2009

(54) MANAGING TOPOLOGY CHANGES IN MEDIA APPLICATIONS

(75) Inventors: Samuel Amin, Seattle, WA (US); Brian D. Crites, Redmond, WA (US); Kirt A. Debique, Seattle, WA (US); Sohail Baig Mohammed, Redmond, WA (US); Niranjan S. Nayak, Bellevue, WA (US); Eric H. Rudolph, Woodinville, WA (US); Mei L. Wilson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 485 days.

This patent is subject to a terminal disclaimer.

(21) Appl. No.: 10/796,503

(22) Filed: Mar. 8, 2004

(65) Prior Publication Data

US 2005/0198623 A1 Sep. 8, 2005

(51) Int. Cl.
*G06F 9/44* (2006.01)
*H04N 9/475* (2006.01)
(52) U.S. Cl. ...................... 717/120; 348/512
(58) Field of Classification Search ......... 717/120–123; 719/322; 348/500, 512–513
See application file for complete search history.

(56) References Cited

U.S. PATENT DOCUMENTS

| | | | |
|---|---|---|---|
| 5,140,437 A | 8/1992 | Yonemitsu et al. | |
| 5,420,801 A | 5/1995 | Dockter et al. | |
| 5,528,281 A * | 6/1996 | Grady et al. | 725/93 |
| 5,539,886 A | 7/1996 | Aldred et al. | |
| 5,546,584 A | 8/1996 | Lundin et al. | |
| 5,574,934 A | 11/1996 | Mirashrafi et al. | |
| 5,577,258 A | 11/1996 | Cruz et al. | |
| 5,604,843 A | 2/1997 | Shaw et al. | |
| 5,625,404 A * | 4/1997 | Grady et al. | 725/114 |
| 5,675,752 A | 10/1997 | Scott et al. | |
| 5,712,906 A * | 1/1998 | Grady et al. | 379/93.25 |
| 5,764,965 A | 6/1998 | Poimboeuf et al. | |
| 5,765,011 A | 6/1998 | Wilkinson et al. | |
| 5,786,814 A | 7/1998 | Moran et al. | |
| 5,802,283 A * | 9/1998 | Grady et al. | 709/227 |

(Continued)

FOREIGN PATENT DOCUMENTS

EP 0784271 A2 7/1997

(Continued)

OTHER PUBLICATIONS

Jaffe et al., "Automatic update of replicated topology data bases," 1984, ACM, p. 142-148.*

(Continued)

*Primary Examiner*—Wei Y Zhen
*Assistant Examiner*—Qing Chen
(74) *Attorney, Agent, or Firm*—Lee & Hayes, PLLC

(57) ABSTRACT

Systems and methods for resolving a partial topology are disclosed. In one embodiment a media engine includes a topology loader module that receives a partial topology from another module associated with the media engine. The topology loader implements logic operations that convert a partial topology into a full topology, which may be returned to the media engine for presentation of the media stream(s) to a user.

27 Claims, 6 Drawing Sheets

U.S. PATENT DOCUMENTS

| | | | |
|---|---|---|---|
| 5,815,689 A | | 9/1998 | Shaw et al. |
| 5,878,431 A * | | 3/1999 | Potterveld et al. ....... 707/103 R |
| 5,886,274 A | | 3/1999 | Jungleib |
| 5,887,139 A | | 3/1999 | Madison, Jr. et al. |
| 5,892,767 A | | 4/1999 | Bell et al. |
| 5,936,643 A * | | 8/1999 | Tindell et al. ............... 345/541 |
| 5,987,628 A | | 11/1999 | Von Bokern et al. |
| 5,995,512 A * | | 11/1999 | Pogue, Jr. .................. 370/419 |
| 5,996,015 A * | | 11/1999 | Day et al. ................... 709/226 |
| 6,014,706 A | | 1/2000 | Cannon et al. |
| 6,038,625 A | | 3/2000 | Ogino et al. |
| 6,044,408 A | | 3/2000 | Engstrom et al. |
| 6,178,172 B1 * | | 1/2001 | Rochberger ............ 370/395.32 |
| 6,185,612 B1 * | | 2/2001 | Jensen et al. ................ 709/223 |
| 6,192,354 B1 | | 2/2001 | Bigus et al. |
| 6,209,041 B1 | | 3/2001 | Shaw et al. |
| 6,243,753 B1 | | 6/2001 | Machin et al. |
| 6,262,776 B1 | | 7/2001 | Griffits |
| 6,263,486 B1 | | 7/2001 | Boezeman et al. |
| 6,266,053 B1 | | 7/2001 | French et al. |
| 6,279,029 B1 | | 8/2001 | Sampat et al. |
| 6,308,216 B1 | | 10/2001 | Goldszmidt et al. |
| 6,317,131 B2 * | | 11/2001 | Basso et al. ................. 345/474 |
| 6,321,252 B1 | | 11/2001 | Bhola et al. |
| 6,343,313 B1 | | 1/2002 | Salesky et al. |
| 6,347,079 B1 | | 2/2002 | Stephens et al. |
| 6,369,835 B1 | | 4/2002 | Lin |
| 6,385,201 B1 * | | 5/2002 | Iwata ......................... 370/400 |
| 6,389,467 B1 | | 5/2002 | Eyal |
| 6,430,526 B1 * | | 8/2002 | Toll ............................... 703/1 |
| 6,466,971 B1 | | 10/2002 | Humpleman et al. |
| 6,536,043 B1 | | 3/2003 | Guedalia |
| 6,539,163 B1 | | 3/2003 | Sheasby et al. |
| 6,546,426 B1 | | 4/2003 | Post |
| 6,549,932 B1 * | | 4/2003 | McNally et al. ............. 709/202 |
| 6,581,102 B1 | | 6/2003 | Amini et al. |
| 6,594,699 B1 | | 7/2003 | Sahai et al. |
| 6,594,773 B1 | | 7/2003 | Lisitsa et al. |
| 6,618,752 B1 | | 9/2003 | Moore et al. |
| 6,625,643 B1 | | 9/2003 | Colby et al. |
| 6,658,477 B1 | | 12/2003 | Lisitsa et al. |
| 6,687,664 B1 | | 2/2004 | Sussman et al. |
| 6,691,312 B1 | | 2/2004 | Sen et al. |
| 6,694,368 B1 | | 2/2004 | An et al. |
| 6,711,171 B1 | | 3/2004 | Dobbins et al. |
| 6,725,274 B1 | | 4/2004 | Slik |
| 6,725,279 B1 * | | 4/2004 | Richter et al. ............... 719/313 |
| 6,757,735 B2 | | 6/2004 | Apostolopulos et al. |
| 6,802,019 B1 | | 10/2004 | Lauder |
| 6,810,526 B1 | | 10/2004 | Menard et al. |
| 6,823,225 B1 | | 11/2004 | Sass |
| 6,920,181 B1 | | 7/2005 | Porter |
| 6,957,430 B2 * | | 10/2005 | Fant et al. ................... 718/100 |
| 6,975,752 B2 | | 12/2005 | Dixon et al. |
| 7,024,483 B2 * | | 4/2006 | Dinker et al. ............... 709/227 |
| 7,035,858 B2 * | | 4/2006 | Dinker et al. ................. 707/10 |
| 7,047,554 B1 | | 5/2006 | Lortz |
| 7,076,564 B2 | | 7/2006 | To et al. |
| 7,124,424 B2 | | 10/2006 | Gordon et al. |
| 7,139,925 B2 * | | 11/2006 | Dinker et al. ................... 714/4 |
| 7,197,535 B2 | | 3/2007 | Salesky et al. |
| 7,206,854 B2 * | | 4/2007 | Kauffman et al. ........... 709/231 |
| 7,240,325 B2 * | | 7/2007 | Keller ......................... 717/104 |
| 7,246,318 B2 * | | 7/2007 | Debique et al. ............. 715/734 |
| 7,290,057 B2 * | | 10/2007 | Saunders et al. ............ 709/231 |
| 7,299,485 B2 | | 11/2007 | Chaney et al. |
| 7,330,542 B2 | | 2/2008 | Kauhanen et al. |
| 7,415,537 B1 | | 8/2008 | Maes |
| 7,426,637 B2 * | | 9/2008 | Risan et al. ................. 713/165 |
| 2001/0024455 A1 | | 9/2001 | Thaler et al. |
| 2002/0051017 A1 | | 5/2002 | Wishoff |
| 2002/0099842 A1 * | | 7/2002 | Jennings et al. ............. 709/231 |
| 2002/0158897 A1 * | | 10/2002 | Besaw et al. ................. 345/734 |
| 2002/0199031 A1 | | 12/2002 | Rust et al. |
| 2003/0028643 A1 | | 2/2003 | Jabri |
| 2003/0033424 A1 | | 2/2003 | Gould |
| 2003/0056029 A1 | | 3/2003 | Huang et al. |
| 2003/0093568 A1 | | 5/2003 | Deshpande |
| 2003/0095504 A1 | | 5/2003 | Ogier |
| 2003/0101253 A1 | | 5/2003 | Saito et al. |
| 2003/0123659 A1 | | 7/2003 | Forstrom et al. |
| 2003/0146915 A1 | | 8/2003 | Brook et al. |
| 2003/0149772 A1 | | 8/2003 | Hsu et al. |
| 2003/0158957 A1 | | 8/2003 | Abdolsalehi |
| 2003/0177292 A1 | | 9/2003 | Smirnov et al. |
| 2003/0215214 A1 | | 11/2003 | Ma |
| 2003/0231867 A1 | | 12/2003 | Gates et al. |
| 2003/0236892 A1 | | 12/2003 | Coulombe |
| 2003/0236906 A1 | | 12/2003 | Klemets et al. |
| 2004/0001106 A1 | | 1/2004 | Deutscher et al. |
| 2004/0004631 A1 | | 1/2004 | Debique et al. |
| 2004/0042413 A1 | | 3/2004 | Kawamura et al. |
| 2004/0073596 A1 | | 4/2004 | Kloninger et al. |
| 2004/0073912 A1 | | 4/2004 | Meza |
| 2004/0080504 A1 | | 4/2004 | Salesky et al. |
| 2004/0139157 A1 | | 7/2004 | Neely, III et al. |
| 2004/0177162 A1 | | 9/2004 | Wetzel et al. |
| 2004/0207723 A1 | | 10/2004 | Davis et al. |
| 2004/0208132 A1 | | 10/2004 | Neulist et al. |
| 2004/0220926 A1 | | 11/2004 | Lamkin et al. |
| 2004/0236945 A1 | | 11/2004 | Risan et al. |
| 2004/0267778 A1 * | | 12/2004 | Rudolph et al. ............. 707/100 |
| 2004/0267899 A1 * | | 12/2004 | Rahman et al. ............. 709/217 |
| 2004/0267953 A1 * | | 12/2004 | Dunbar et al. .............. 709/231 |
| 2004/0268224 A1 | | 12/2004 | Balkus et al. |
| 2004/0268357 A1 | | 12/2004 | Joy et al. |
| 2004/0268407 A1 | | 12/2004 | Sparrell et al. |
| 2005/0005025 A1 | | 1/2005 | Harville et al. |
| 2005/0018775 A1 | | 1/2005 | Subramanian et al. |
| 2005/0055517 A1 | | 3/2005 | Olds et al. |
| 2005/0066082 A1 | | 3/2005 | Forin et al. |
| 2005/0081158 A1 | | 4/2005 | Hwang |
| 2005/0125734 A1 * | | 6/2005 | Mohammed et al. ........ 715/731 |
| 2005/0132168 A1 * | | 6/2005 | Weiss et al. ................. 712/203 |
| 2005/0172309 A1 | | 8/2005 | Risan et al. |
| 2005/0188311 A1 | | 8/2005 | Diesel et al. |
| 2005/0198189 A1 | | 9/2005 | Robinson et al. |
| 2005/0204289 A1 * | | 9/2005 | Mohammed et al. ........ 715/731 |
| 2005/0226324 A1 | | 10/2005 | Ouyang et al. |
| 2005/0262254 A1 | | 11/2005 | Sherwani |
| 2007/0011321 A1 | | 1/2007 | Huntington et al. |
| 2008/0037957 A1 | | 2/2008 | Nallur et al. |
| 2008/0154407 A1 | | 6/2008 | Carson |

FOREIGN PATENT DOCUMENTS

| | | | |
|---|---|---|---|
| EP | 0814403 A1 | | 12/1997 |
| JP | 2002514797 | | 5/2002 |
| WO | WO9621189 A1 | | 7/1996 |
| WO | WO9957837 A2 | | 11/1999 |

OTHER PUBLICATIONS

Agarwal et al., "The Totem Multiple-Ring Ordering and Topology Maintenance Protocol," 1998, ACM, p. 93-132.*
Bao et al., "Topology Management in Ad Hoc Networks," 2003, ACM, p. 129-140.*
Chatterjee et al., "Microsoft DirectShow: A New Media Architecture," SMPTE Journal, 1997, p. 865-871.*
Cline et al., "DirectShow™ RTP Support for Adaptivity in Networked Multimedia Applications," IEEE, 1998, p. 13-22.*
Timothy K. Shih, "Participator Depenent Multimedia Presentation", Journal of Information Sciences, vol. 107, pp. 85-105, 1998.
Timothy K. Shih and Wen C. Pai, "A Stepwise Refinement Approach to Multimedia Presentation Designs", IEEE, pp. 117-122, 1997.

Arbab Ali Samejo et al., "Graphical User Interface Based Multimedia Web Suite in Windows Evironment", Mehran Unversity Research Journal of Engineering & Technology, vol. 20, No. 2, pp. 57-68, Apr. 2001.

Timothy Shih, et al., "A Knowledge Abstraction Approach for Multimedia Presentation", IEEE, pp. 528-532, 1997.

Sei-Hoon Lee and Chang-Jong Wang, "Open Multimedia/Hypermedia Application Development Environment", Inspec, 1996.

Chi-Ming Chung, et al., "A Control and Data Abstraction Approach for Multimedia Presentation", Journal of the Chinese Institute of Electrical Engineering, vol. 5, No. 3, pp. 265-276, 1998.

Robertson, Mark A.; Stevenson, Robert L.; "Temporal Resolution Enhancement in Compressed Video Sequences"; University of Notre Dame, Notre Dame, Indiana; Sep. 2001; pp. 1-11.

Girod, Bernd; Farber, Niko; "Feedback-Based Error control for Mobile Video Transmission"; Proceedings of the IEEE, v 87, n10, Oct. 1999; pp. 1707-1723.

Chien, Shao-Yi; Chen, Ching-Yeh; Huang, Yu-Wen; and Chen, Liang-Gee; "Multiple Sprites and Frame Skipping Techniques for Sprite Generation with High Subjuctive Quality and Fast Speed"; IEEE 2002; pp. 785-788.

Dunn, et al., "The Design and Implementation of JaDiSM", pp. 1-38, University of Colorado at Boulder.

Sullivan, et al., "Programming with the Java Media Framework", Wiley Computing Publishing, Sean C. Sullivan, Loren Winzeler, Jeanine Deagen, and Deanna Brown, 1998, pp. 1-99.

"How Terminal Services Works", retrieved on May 1, 2008 at <<http://technet2.microsoft.com/windowsserver/en/library/2cb5c8c9-cadc-44a9-bf39-856127f4c8271033.mspx>>, Microsoft TechNet, updated Mar. 28, 2003, pp. 1-15.

Maharaj, "A Primitive Window System Using GDI+ and C#", retrieved May 1, 2008 at <<http://web.archive.org/web/20020605051526/http://www.csharphelp.com/archives2/archive306.html>>, pp. 1-3.

Barth, et al., "Configuring Distributed Multimedia Applications Using CINEMA", retrieved on Jan. 19, 2008 at <<http://ieeeexplore.ieee.org/xpls/absprintf.jsp?arnumber=557748>> Published 2006, pp. 10.

* cited by examiner

MANAGING TOPOLOGY CHANGES IN MEDIA APPLICATIONS

TECHNICAL FIELD

The described subject matter relates to electronic computing, and more particularly to systems and methods for managing topology changes in media applications.

BACKGROUND

Media content has traditionally been distributed using equipment and protocols that are application-specific, and in some cases proprietary. For example, video content has traditionally been encoded in an analog format and distributed over television networks, cable networks, satellite networks, and video cassette tapes. Special purpose capture and transmission devices are required to generate the content. Similarly, special purpose receivers and display devices are required to access the content.

The widespread digitization of media (including multimedia) content, especially by the consumer segment, coupled with the growth in digital communication networks and easier methods to transfer digital content is changing the nature of media content delivery and usage. Media content can now be captured and encoded in one or more of a plurality of digital formats (e.g., MPEG, Windows Media Format, VCD, etc.) distributed over digital networks such as the Internet or on digital media and accessed using general purpose computing equipment or special purpose equipment.

Digital computing devices play a central role in digital media production, encoding, distribution, and display. Microsoft Corporation of Redmond, Wash., USA, has developed a set of technologies to facilitate the use of digital media and the integration of digital media processing components (both hardware and software) with personal computers. MICROSOFT DIRECTSHOW is a digital media streaming architecture designed for digital audio, video and other types of digital data. DIRECTSHOW provides a high-level application model that enables independent hardware vendors (IHVs) and independent software vendors (ISVs) to develop streaming media applications that combine and use components from possibly different vendors and run on computers using the WINDOWS brand operating system.

Additional infrastructure to facilitate the integration of digital media components is desirable to facilitate continued development in the digital media marketplace and to increase the flexibility that users and developers have to create innovative uses of those components.

SUMMARY

Implementations described herein provide systems and methods for managing topology changes in media applications. In an exemplary implementation, a method for managing topology changes in media applications is provided. The method comprises receiving a partial media topology that includes a plurality of nodes including at least a first media source node and at least a first media sink node; retrieving a cached media topology that includes a plurality of nodes including at least a second media source node, at least a second media sink node, and at least one transform node; and copying one or more nodes from the cached media topology to the partial media topology.

In another exemplary implementation, a system is provided. The system comprises one or more computer-readable media; and a media engine embodied on the one or more computer-readable media and configured to communicatively interact with an application to present a media presentation. The media engine is configured to use a media session to generate a partial topology, the partial topology including one or more media sources individual ones of which serving as a source of media content, and one or more media sinks configured to sink a media stream, and a topology loader to resolve the partial topology into a full topology. The topology loader is configured to copy one or more nodes from a cached media topology to the partial media topology.

In another exemplary implementation, one or more computer-readable media comprising computer executable instructions are provided. When executed on a computer, the instructions direct the computer to receive a partial media topology that includes a plurality of nodes including at least a first media source node and at least a first media sink node; retrieve a cached media topology that includes a plurality of nodes including at least a second media source node, at least a second media sink node, and at least one transform node; and copy one or more nodes from the cached media topology to the partial media topology.

In another exemplary implementation, a topology loader module is provided. The topology loader module comprises computer executable instructions that, when executed by a computer, provide means for receiving a partial media topology that includes a plurality of nodes including at least a first media source node and at least a first media sink node; means for retrieving a cached media topology that includes a plurality of nodes including at least a second media source node, at least a second media sink node, and at least one transform node; and means for copying one or more nodes from the cached media topology to the partial media topology.

DETAILED DESCRIPTION

Described herein are exemplary storage network architectures and methods for managing topology changes in media applications. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Exemplary Environment

Figure 1:
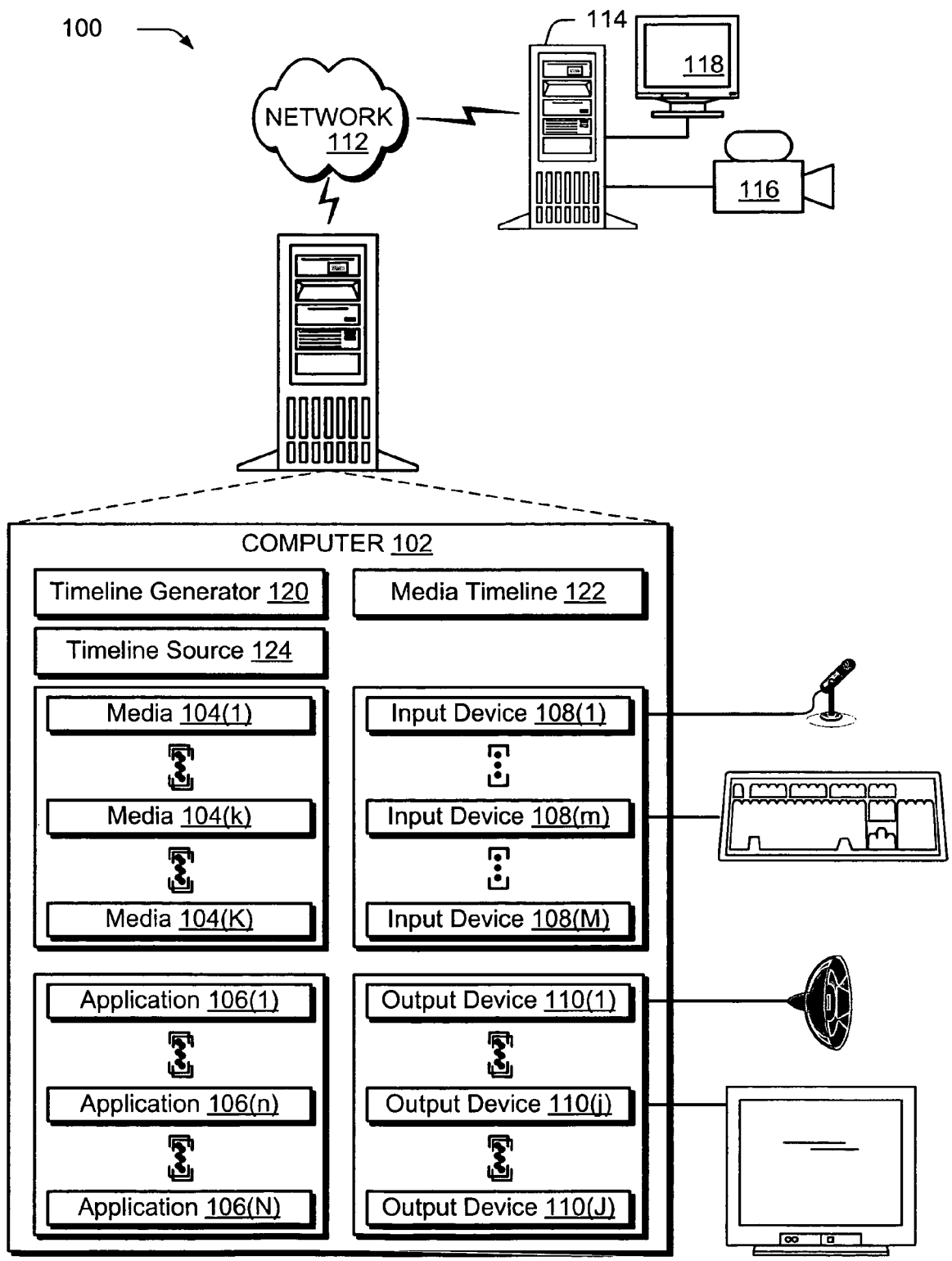
FIG. 1 is an illustration of an environment in an exemplary implementation in which a computer provides access to a plurality of media.

FIG. 1 is an illustration of an environment 100 in an exemplary implementation in which a computer 102 provides access to a plurality of media. The computer 102, as illustrated, may be configured as a personal computer (PC). The computer 102 may also assume a variety of other configurations, such as a mobile station, an entertainment appliance, a set-top box communicatively coupled to a display device, a wireless phone, a video game console, a personal digital assistant (PDA), and so forth. Thus, the computer 102 may range from a full resource device with substantial memory and processor resources (e.g., PCs, television recorders equipped with hard disk) to a low-resource device with limited memory and/or processing resources (e.g., a traditional set-top box). An additional implementation of the computer 102 is described in relation to FIG. 6.

The computer 102 may obtain a variety of media from a variety of media sources. For example, the computer 102 may locally store a plurality of media 104(1), . . . , 104(k), . . . , 104(K). The plurality of media 104(1)-104(K) may include an assortment of audio and video content having various formats. Further, the media 104(1)-104(K) may be obtained from a variety of sources, such as from an input device, from execution of an application, and so on.

The computer 102, for instance, may include a plurality of applications 106(1), . . . , 106(n), . . . , 106(N). One or more of the plurality of applications 106(1)-106(N) may be executed to provide media, such as documents, spreadsheets, video, audio, and so on. Additionally, one or more of the plurality of applications 106(1)-106(N) may be configured to provide media interaction, such as encoding, editing, and/or playback of the media 104(1)-104(K).

The computer 102 may also include a plurality of input devices 108(1), . . . , 108(m), . . . , 108(M). One or more of the plurality of input devices 108(1)-108(M) may be configured to provide media for input to the computer 102. Input device 108(1), for instance, is illustrated as a microphone that is configured to provide an input of audio data, such as a voice of the user, a song at a concert, and so on. The plurality of input devices 108(1)-108(M) may also be configured for interaction by a user to provide inputs that control execution of the plurality of applications 106(1)-106(N). For example, input device 108(1) may be utilized to input voice commands from the user, such as to initiate execution of a particular one of the plurality of applications 106(1)-106(N), control execution of the plurality of applications 106(1)-106(N), and so forth. In another example, input device 108(m) is illustrated as a keyboard that is configured to provide inputs to control the computer 102, such as to adjust the settings of the computer 102.

Further, the computer 102 may include a plurality of output devices 110(1), . . . , 110(j), . . . , 110(J). The output devices 110(1)-110(J) may be configured to render media 104(1)-104(K) for output to the user. For instance, output device 110(1) is illustrated as a speaker for rendering audio data. Output device 110(j) is illustrated as a display device, such as a television, that is configured to render audio and/or video data. Thus, one or more of the plurality of media 104(1)-104(K) may be provided by the input devices 108(1)-108(M) and stored locally by the computer 102. Although the plurality of input and output devices 108(1)-108(M), 110(1)-110(J) are illustrated separately, one or more of the input and output devices 108(1)-108(M), 110(1)-10(J) may be combined into a single device, such as a television having buttons for input, a display device, and a speaker.

The computer 102 may also be configured to communicate over a network 112 to obtain media that is available remotely over the network 112. The network 112 is illustrated as the Internet, and may include a variety of other networks, such as an intranet, a wired or wireless telephone network, a broadcast network, and other wide area networks. A remote computer 114 is communicatively coupled to the network 112 such that the remote computer 114 may provide media to the computer 102. For example, the remote computer 114 may include one or more applications and a video camera 116 that provides media, such as home movies. The remote computer 114 may also include an output device to output media, such as the display device 118 as illustrated. The media obtained by the computer 102 from the remote computer 114 over the network 112 may be stored locally with the media 104(1)-104(K). In other words, media 104(1)-104(K) may include locally stored copies of media obtained from the remote computer 114 over the network 112.

Thus, the computer 102 may obtain and store a plurality of media 104(1)-104(K) that may be provided both locally (e.g., through execution of the plurality of applications 106(1)-106(N) and/or use of the plurality of input device 108(1)-108(M)), and remotely from the remote computer 114 (e.g., through execution of application and/or use of input devices). Although the plurality of media 104(1)-104(K) has been described as stored on the computer 102, the media 104(1)-104(K) may also be provided in "real-time". For example, audio data may be streamed from the input device 108(1), which is illustrated as a microphone, without storing the audio data.

The computer 102 includes a timeline generator 120 that, when executed on the computer 102, generates a media timeline 122. For example, the timeline generator 120 may be configured as an application that exposes one or more software components that may be used to generate the media timeline 122, such as through a user interface by a user. As previously described, the media timeline 122 provides a technique for a user to define a presentation of stored and/or real-time media from the plurality of media sources. For example, the media timeline 122 may describe a collection of media that was obtained from the input devices 108(1)-108(M), the applications 106(1)-106(N), and/or the remote computer 114. The user may utilize one or more of the input devices 108(1)-108(M) to interact with the timeline generator 120 to define groupings and/or combinations of the media 104(1)-104(K). The user may also define an order and effects for presentation of the media 104(1)-104(K). A timeline source 124 may then be executed on the computer 102 to render the media timeline 122. The media timeline 122, when rendered, provides the expressed groupings and/or combinations of the media 104(1)-104(K) for rendering by one or more of the plurality of output devices 110(1)-110(J). Additionally, the timeline generator 120 may also programmatically generate the media timeline 122 as is described in greater detail in the following implementation.

Figure 2:
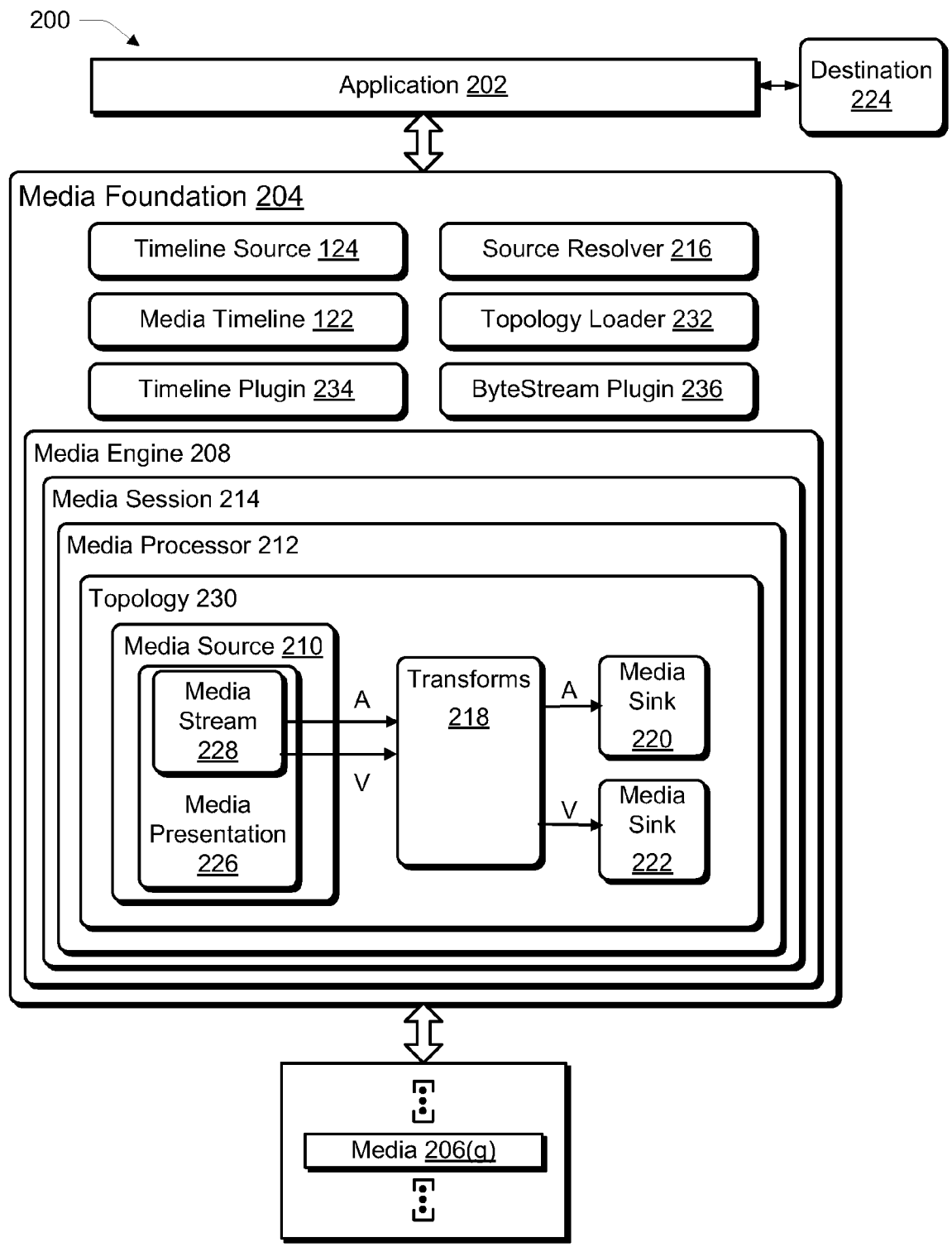
FIG. 2 is a high level block diagram of a system in an exemplary implementation in which the system, implemented in software, includes an application that interacts with a media foundation to control presentation of a plurality of media.

FIG. 2 is a high level block diagram of a system 200 in an exemplary implementation in which the system 200, implemented in software, includes an application 202 that interacts with a media foundation 204 to control presentation of a plurality of media 206(g), where "g" can be any number from one to "G". The media foundation 204 may be included as a part of an operating system to provide playback of the media 206(g) such that applications that interact with the operating system may control playback of the media 206(g) without "knowing" the particular details of the media formats. The media 206(g) may be provided from a variety of sources, such as from the media 104(1)-104(K) of FIG. 1, through execution of the applications 106(1)-106(N), use of the input devices 108(1)-108(M), output devices 110(1)-100(J), and so on.

The application 202, which may be the same as or different from applications 106(1)-106(N) of FIG. 1, interacts with a media engine 208 to control the media 104(1)-104(K). In at least some embodiments, the media engine 208 serves as a central focal point of the application 202 that desires to somehow participate in a presentation. A presentation, as used in this document, refers to or describes the handling of media. In the illustrated and described embodiment, a presentation is used to describe the format of the data on which the media engine 208 is to perform an operation. Thus, a presentation can result in visually and/or audibly presenting media, such as a multimedia presentation in which both audio and accompanying video is presented to user within a window rendered on a display device, such as output device 110(j) of FIG. 1 that is illustrated as a display device that may be associated with a desk-top PC. A presentation can also result in writing media content to a computer-readable medium such as a disk file. Thus, a presentation is not limited to scenarios in which multimedia content is rendered on a computer. In some embodiments, operations such as decoding, encoding and various transforms (such as transitions, effects and the like), can take place as a result of a presentation.

In an embodiment, the media foundation 204 exposes one or more application program interfaces that can be called by the application 202 to interact with the media 206(g). For example, the media foundation 204 may be thought of as existing at an "infrastructure" level of software that is executed on the computer 102 of FIG. 1. In other words, the media foundation 204 is a software layer used by the application 202 to interact with the media 206(g). The media foundation 204 may be utilized to control a number of aspects of the media 206(g), such as output, rendering, storage, and so on. Thus, the media foundation 204 may be utilized such that each application 202 does not have to implement separate code for each type of media 206(g) that may be used in the system 200. In this way, the media foundation 204 provides a set of reusable software components to do media specific tasks.

The media foundation 204 may utilize several components among which include the media timeline 122, the timeline source 124, a media source 210, a media processor 212, a media session 214, the media engine 208, a source resolver 216, one or more transforms 218, one or more media sinks 220, 222, and so on. One advantage of various illustrated and described embodiments is that the system 200 is a pluggable model in the sense that a variety of different kinds of components can be utilized in connection with the systems described herein. Also included as a part of system 200 is a destination 224, which is discussed in more detail below. In at least one embodiment, however, the destination 224 is an object that defines where a presentation is to be presented (e.g. a window, disk file, and the like) and what happens to the presentation. That is, the destination may correspond to one or more of the media sinks 220, 222 into which data flows.

The media timeline 122 employs a timeline object model which provides a way for a user to define a presentation based on media that is rendered by the timeline source 124. The media timeline 122 may range from a sequential list of media files to more complex forms. For example, the media timeline 122 may employ file structures, such as SMIL (Synchronized Multimedia Integration Language) and AAF (Advanced Authoring Format), to express media playback experiences that include transitions between media, effects, and so on. The application 202, for instance, may be configured as a media player that can play a list of songs, which is commonly referred to as a playlist. As another example, in an editing system a user may overlay one video over the other, clip a media, add effect to the media and so forth. Such groupings or combinations of media may be expressed using the media timeline 122.

The media source 210 is utilized to abstract a provider of media. The media source 210, for instance, may be configured to read a particular type of media from a particular source. For example, one type of media source might capture video from the outside world (a camera), and another might capture audio (a microphone). Alternately or additionally, the media source 210 may read a compressed data stream from disk and separate the data stream into its compressed video and compressed audio components. Yet another media source 210 might obtain data from the network 112 of FIG. 1. Thus, the media source 210 may be utilized to provide a consistent interface to acquire media.

The media source 210 provides one or more media presentation 226 objects (media presentation). The media presentation 226 abstracts a description of a related set of media streams. For example, the media presentation 226 may provide a paired audio and video stream for a movie. Additionally, the media presentation 226 may describe the configuration of the media source 210 at a given point in time. The media presentation 226, for instance, may contain information about the media source 210 including descriptions of the available streams of the media source 210 and their media types, e.g. audio, video, MPEG, and so on.

The media source 210 may also provide a media stream 228 object (media stream) which may represent a single stream from the media source 210 which can be accessed by the application 202, i.e. exposed to the application 202. The media stream 228 thus allows the application 202 to retrieve samples of the media 206(g).

In the media foundation 204, therefore, the media source 210 is defined as a software component which outputs samples for a presentation. The timeline source 124 interprets the media timeline 122, but at the same time, may also act in a manner similar to the media source 210. For example, the timeline source 210 may be utilized to hide the intricacies of rendering the media timeline 122 to provide media described by the media timeline 122 from other components of the media foundation 204.

The media processor 212 manages data flow in a topology 230. The topology 230 defines how data flows through various components for a given presentation. A "full" topology includes each of the components, e.g. software modules, used to manipulate the data such that the data flows with the correct format conversions between different components. When a topology is created, the user might choose to create it partially. This partial topology is not sufficient, by itself, to provide a final presentation. Therefore, a component called the topology loader 232 may take the partial topology and convert it into a full topology by adding the appropriate data conversion transforms between the components in the partial topology.

In the topology 230, for example, data generally originates at the media source 210, flows through one or more transforms 218, and proceeds into one or more media sinks 220, 222. Transforms 218 can include any suitable data handling components that are typically used in presentations. Such components can include those that uncompress compressed data and/or operate on data in some way, such as by imparting an effect to the data, as will be appreciated by the skilled artisan. For example, for video data, transforms can include those that affect brightness, color conversion, and resizing.

For audio data, transforms can include those that affect reverberation and re-sampling. Additionally, decoding and encoding can be considered as transforms.

Media sinks 220, 222 are typically associated with a particular type of media content. Thus, audio content might have an associated audio sink such as an audio renderer. Likewise, video content might have an associated video sink such as a video renderer. Additional media sinks can send data to such things as computer-readable media, e.g. a disk file and the like.

The media session 214 is a component which may schedule multiple presentations. Therefore, the media processor 212 may be used to drive a given presentation, and the media session 214 utilized to schedule multiple presentations. The media session 214, for instance, may change topologies that are rendered by the media processor 212. For example, the media session 214 may change from a first topology that is rendered on the media processor 212 to a second topology such that there is no gap between the renderings of samples from the consecutive presentations that are described by the respective topologies. Thus, the media session 214 may provide a seamless user experience as the playback of the media moves from one presentation to another.

The source resolver 216 component may be utilized to create a media source 210 from URLs and/or byte stream objects. The source resolver 216 may provide both synchronous and asynchronous ways of creating the media source 210 without requiring prior knowledge about the form of data product by the specified resource.

In at least one embodiment, the media foundation 204 is utilized to abstract away the specific details of the existence of and interactions between various components of the media foundation 204. That is, in some embodiments, the components that are seen to reside inside the media foundation 204 are not visible, in a programmatic sense, to the application 202. This permits the media foundation 202 to execute so-called "black box" sessions. For example, the media engine 208 can interact with the media session 214 by providing the media session certain data, such as information associated with the media (e.g. a URL) and the destination 224, and can forward the application's 202 commands (e.g. open, start, stop and the like) to the media session 214. The media session 214 then takes the provided information and creates an appropriate presentation using the appropriate destination.

The media foundation 204 may also include a timeline plugin 234. The timeline plugin 234 may be utilized such that different media timeline file formats may be "plugged-in" to the media foundation 204. For example, a bytestream plugin 236 may be written for a format in question and registered with the media foundation 204. The source resolver 216 may then invoke a bytestream plugin 236 when a file of that type is opened. In turn the bytestream plugin 236 can parse the file, create a media timeline 122 representing the presentation described in the file, and create a timeline source 124 for it. In general, the bytestream plugin 236 is responsible for reading the raw bytestream and creating a media source 208 for it. In an implementation, the remaining components of media foundation 204 are not made aware that the media source created in this instance is a timeline source 124. Therefore, the timeline source 124 is treated like any other media source 208. In an implementation, a bytestream plugin 236 that can parse a media timeline 122 and create a timeline source 124 is referred to as a timeline plugin.

The timeline plugin 234 may also provide an interface such that the application 202 may interact with the timeline plugin directly, such as to load and save the media timeline 122 from or to a file. For example, the timeline plugin 234 may be created and then called to initiate a load function to provide a bytestream. The timeline plugin 234 may then parse the file and create a root node and any additional nodes to create the media timeline 122. The timeline plugin 234 may also be used to persist the media timeline 122 to different formats. For example, the application 202 may create the media timeline 122 programmatically. In other words, the application may act as the timeline generator 120 of FIG. 1. The application 202 may then create a timeline plugin for ASX (Advanced Stream Redirector) files, and ask the timeline plugin to save the media timeline 122 in the ASX format. In another example, a user can open an m3u file, i.e. a playlist file format for specifying multiple MP3 files, get the media timeline 122 from it, and then ask the timeline plugin to save the media timeline 122 in the ASX format. In this way, the media foundation 204 may expose a plurality of software components that provide media functionality over an application programming interface for use by the application 202.

Given the description of the system of FIG. 2, the discussion that follows provides a general overview of a typical multimedia scenario, along with a description of the roles that the media engine 208 and media session 214 plays in driving the presentation. In the discussion that follows, each of the media engine (and its role) and media session (and its role) are discussed in sections under their own respective headings—i.e., "Media Engine Work" and "Media Session Work".

Media Engine Work

In accordance with one embodiment, the work that the media engine 208 performs during a presentation can be categorized, generally, under a number of different headings which appear below. The categories of media engine work include source resolution, setting up the media session, partial topology resolution, topology resolution and activation, presentation control, new presentations, and output changes.

Source Resolution

Source resolution pertains to the process by which the media engine 208 causes the appropriate media source to be created for the particular type of data that is to be read and subsequently processed by the system. Thus, this process obtains a media source from which the multimedia data can be read. This process is relevant when, for example, the OpenURL or OpenByteStream methods (discussed above and below) are called to open the multimedia. In either case, the media engine 208 passes the URL or the Byte Stream, respectively, to a component known as a source resolver. If the source resolver is given a URL, then it looks at the scheme of the URL (e.g., file://, http://, etc) to create a Byte Stream that will read from the specified location.

In both cases, the source resolver is able to look at the contents of the Byte Stream to determine the format of the bits (e.g., ASF, AVI, MPECA etc) so that a media source can be instantiated that will understand that format. The other Open functions discussed above and below specify the media source directly.

Setting up the Media Session

During this process, the media engine asks the media source that is created for a presentation descriptor. In some embodiments, the presentation descriptor may specify that a custom media session is to be used. In many cases, however, custom media sessions may not be used in which case a default media session can be instantiated.

Partial Topology Creation

During partial topology creation, the media engine 208 obtains a presentation descriptor from the media source(s) 210 and notifies the application 202 of that particular presentation via the event MENewPresentation. If the application is interested in using that event to configure a destination, the media engine 208 waits for the application to finish handling the event.

The media engine 208 then negotiates with the application-provided destination and the destination can create one or more media sinks for the outputs of the presentation. In some embodiments, media sinks 220, 222 can have already been created and the destination simply hands them over to the media engine.

The media engine 208 invokes the media processor 212 to constructs a "partial topology" that the media engine indicates the source media streams and the output stream sinks, without necessarily specifying the transforms that will be needed to get there. Thus, referring to the FIG. 2 illustration, at this point in the process, the media engine 208 has created a partial topology, a media processor 212 and a media session. Media engine has instantiated or referenced one or more media source(s) 210 and media sink(s) 220, 222.

Figure 3A:
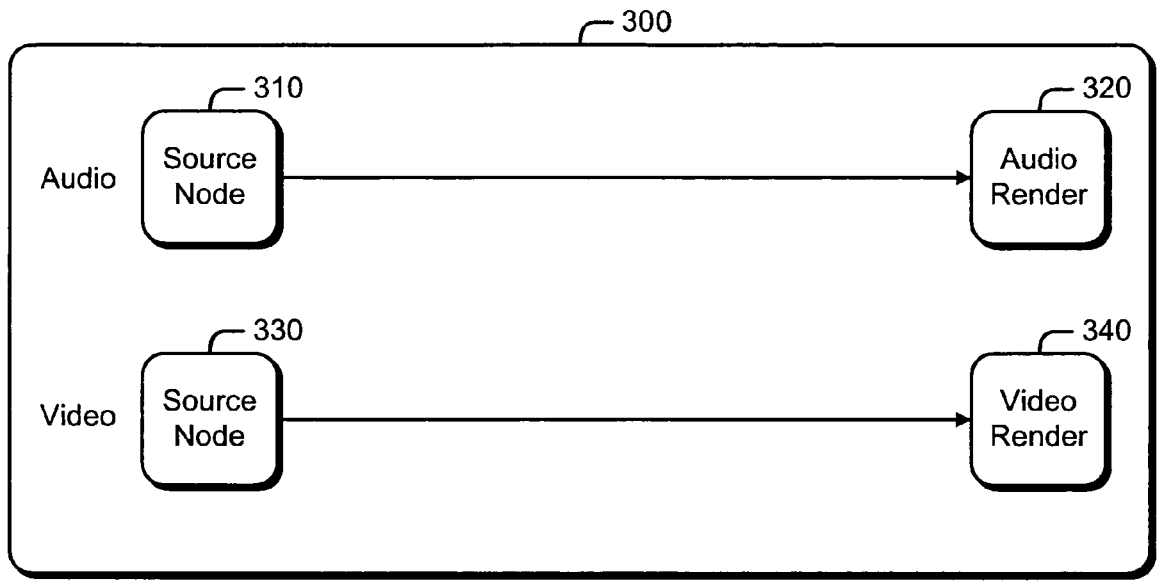
FIG. 3A-3B are a schematic illustrations of an exemplary partial topology.

An exemplary partial topology is depicted in FIG. 3A. Referring to FIG. 3, a partial topology 300 specifies an audio source node 310 and an audio render node 320, a video source node 330 and a video render node 340.

Full Topology Resolution

In performing the topology resolution process, the media session 214 can invoke a component referred to herein as a topology loader 232. The topology loader 232 implements logic instructions to determine which transforms 218 are necessary or desirable to provide the data from the media source(s) 210 to the media sink(s) 220, 222.

Transforms 218 can comprise any suitable data handling components that are typically used in presentations. Such components can include those that uncompress compressed data, and/or compressed uncompressed data, and/or operate on data in some way, such as by imparting an effect to the data, as will be appreciated by the skilled artisan. For example, for video data, transforms can include those that affect brightness, color conversion, and resizing. For audio data, transforms can include those that affect reverberation and resampling. Additionally, decoding and encoding can be considered as transforms.

Figure 3B:
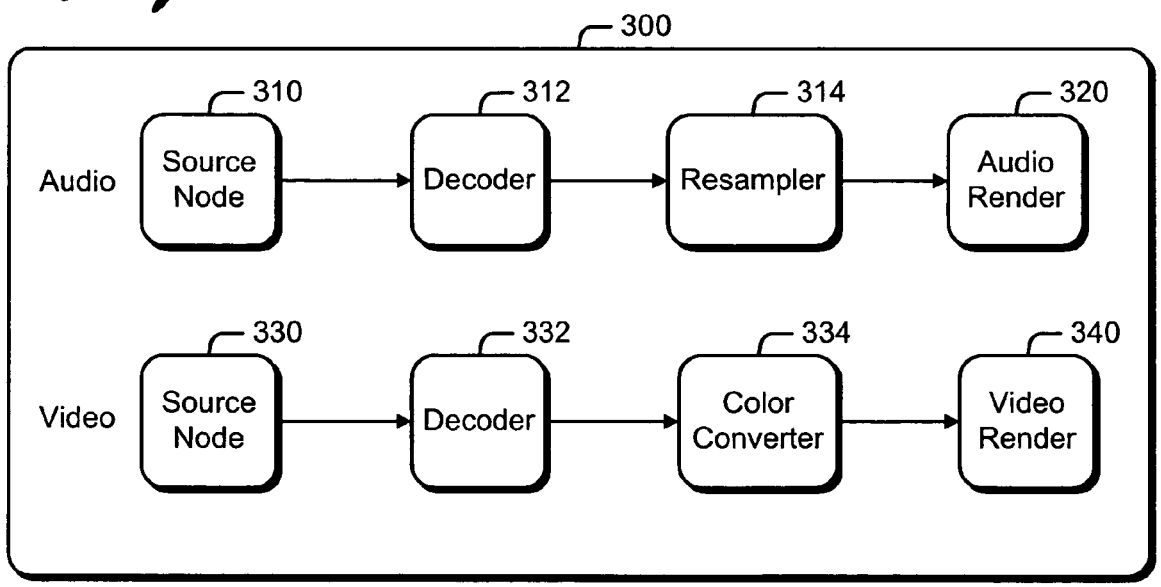

An exemplary full topology is depicted in FIG. 3B. Referring to FIG. 3B, a full topology specifies an audio source node 310, an audio decoder 312, a resampler 314 and an audio render node 320. The full topology further comprises a video source node 330, a video decoder 332, a color converter 334, and a video render node 340.

Topology loader 232 and its operations are described in detail herein.

Topology Resolution and Activation

In accordance with one embodiment, during topology resolution and activation, the media engine 208 asks the media session 214 to resolve the partial topology into a fully specified topology. The media engine 208 then sets the new fully-specified topology on the media session 214, which gives it to the media processor 212. As an example, consider that the media source that is created is one that reads a compressed WMV file. The sinks, on the other hand, are not configured to handle compressed data. Thus, during topology resolution, the media session ascertains which transforms are necessary to provide the compressed data from the WMV file to the sinks and creates the appropriate transforms which, in this case, might comprise a decompressor and possibly resizers, color converters, resamplers, and the like.

In another embodiment, resolution and activation can be combined into a single operation. Specifically, the media engine 208 can set a partial topology on the media session 214 and the media session itself can resolve the partial topology into a fully-specified topology which it then provides to the media processor 212.

Media Processor Creation

The media session 214 is responsible for creating the media processor 212. That is, the media session 214 owns the media processor 212. When the topology is set on the media session 214, the media session 214, in turn, sets the topology on the media processor 212. The media processor 212 follows the data flow laid out by the topology to transform data from the media source(s) 210 to the particular formats that are needed by the media sink(s) 220, 222.

Time Source Selection

One of the functions that the media session 214 can perform pertains to time source selection. Specifically, upon starting a presentation, the media session 214 can make a determination as to which of the available time sources will be used to drive the presentation. Each component can then run its part of the presentation in synchronization with the time from the time source ascertained by the media session. The time source is also used in the presentation clock (owned by the media engine but given to the media session) for the purposes of reporting progress of the presentation.

Media sinks, such as sinks 220, 222 may optionally offer a time source. Typically, the audio renderer (i.e., audio sink) can offer a time source, and the time on the time source will be dictated by the audio device on the particular machine on which the presentation is presented. It is to be appreciated, however, that other media sinks may do so as well. In addition, a particular media source, e.g., live media sources such as device capture and network sources, may also provide some concept of time. In one embodiment, the media session takes care of attempting to make the time source it chooses run at a similar rate to that of the live media source. In one embodiment, the media session 214 can decide which of the time sources is the "highest priority" time source, and this time source is used by the main presentation clock, to which all clock-aware components synchronize their presentations.

Presentation Control

As noted above, the media session 214 can receive method calls to Start, Stop, and Pause from the media engine 208. These calls typically correspond to the applications calls that are made on the media engine 208.

The media session 214 can control the presentation via a Presentation Clock that it receives from the media engine 208. Starting, stopping and/or pausing the Presentation Clock results in all media sink(s) 220, 222 receiving notifications thereof and reacting appropriately. The media session 214 starts, stops, and/or pauses the media processor 212 by respectively calling its start, stop, and/or pause methods directly.

The media session 214 is configured, in this embodiment, to send an event to the media engine 208 after a given operation has been completed by all streams.

New Presentations and Output Changes

In accordance with this embodiment, media session 214 is responsible for forwarding media processor's 240 notification of an upcoming new presentation to media engine 208 and participating with topology resolution and activation, as described above in connection with the media engine.

Time Line Processing

In accordance with one embodiment, media session 214 is configured to reduce glitches at presentation startup time and when transitioning between presentations in a timeline.

In accordance with this embodiment, at startup time, media session 214 will get the first few samples of media data from media processor 212 and deliver them to the media sinks 220, 222 before starting the clock associated with the presentation. This process uses a special "prerolling" capability on the media sinks that allows the media sinks to receive data before actually being started. In this embodiment, it is only after the media sinks receive data via the pre-rolling capability that media session 214 will start the presentation clock.

Because the media sinks 220, 222 have already received the initial data of the data stream, the chances that the media sinks will fall behind (i.e. referred to as a "glitch") at the beginning of the presentation are greatly reduced if not eliminated all together. This can effectively provide for a generally seamless presentation start.

At presentation transition boundaries (i.e. when changing from one presentation to another), media session 214 is configured to attempt to make the transition seamless, i.e. without interruption between the end of the first presentation and the beginning of the second. In accordance with this embodiment, the media session 214 accomplishes this by applying some logic to ensure that the "seamless stream" plays continuously throughout the transition, without waiting for other streams in the presentation to complete (which may cause a glitch during the transition).

Content Protection

In accordance with one embodiment, system 200 and more generally, systems that employ a media session component as described in this document, can employ techniques to ensure that media content that is the subject of a presentation is protected in accordance with rights that may be associated with the content. This concept is also referred to by some as "digital rights management".

Specifically, certain multimedia content may have specific rights associated with it. For example, the content provider may wish to restrict playback of this content to the use of only known, trusted transforms, media sinks and other components. Accordingly, content protection information associated with the media content may, but need not then be embedded in the content as will be appreciated by the skilled artisan. In accordance with this embodiment, media session 214 is configured to respect any content protection requirements by validating all of the components that are being inserted into the pipeline and by making sure that the components are allowed and will be performing allowed actions on the content. Validation can take place by any suitable measures. For example, in validating the component, the media session can then validate the component's signature, and that the signing authority is a trusted authority.

In accordance with one embodiment, the media session 214 can create a protected media path for such content. The protected media path is configured to make it very difficult if not impossible for unauthorized third parties to intercept the data flowing through the pipeline.

Desired Media Engine Configuration

One of the more common scenarios in which the above-described systems and methods can be employed pertains to setting up a simple playback of a multimedia presentation. From the application's point of view, it is desirable for the application to be able to accomplish the following steps in order to configure a multimedia presentation. The application should be able to create a media engine and a playback or presentation destination. The application should also be able to provide a handle to the presentation destination, e.g., a window in which a video for the presentation should be rendered. The application should also be able to call IMFMediaEngine::OpenURL, to supply a URL to the multimedia file to be presented, as well as a pointer to the playback destination. With these capabilities, the application can now cause the media presentation to be played back by using the IMFMediaEngine::Start/Stop/Pause APIs. In one embodiment, the application does not need to wait for any events to arrive as handing of these events are optional. In another embodiment, the application does handle events from the media engine for the open operation to complete.

Exemplary Topology Loader

In an exemplary implementation topology loader 232 implements methods for converting a partial topology generated by the media processor 212 into a full topology. As used herein, the term "full topology" refers to a topology in which all the requisite intermediate transforms are in the topology, all the input and output media types have been set on every object in the topology, and all the source nodes in the topology are ready to run. When the topology loader 232 is finished, the full topology may be processed by the media processor 212.

In an exemplary implementation the topology loader 232 is a public object, in that it is intended that it will be used by an end-user to find fully specified topologies. By way of overview, a client invokes the topology loader 232 by calling a load method and providing a partial topology. The topology loader 232 enumerates all the source nodes in the partial topology and places these nodes into a queue. This queue is then processed node by node to connect each node to its outputs. The internal nodes in the partial topology are added to the queue if and only if all their input connections have been have been resolved. This ensures that the topology loader 232 does not try to configure the outputs of a component before configuring all of its inputs.

For every partial connection the topology loader 232 is trying to connect, the outputs of a node are connected to the inputs of a downstream node. If one or more of the nodes are compressed, then intermediate nodes to decompress the stream may be inserted.

Features and operations of an exemplary implementation of a topology loader 232 are described herein.

External Interfaces and Methods

In an exemplary implementation topology loader 232 provides a plurality of interfaces that may be called by an external process such as, e.g., the media session 214 to invoke functions of the topology loader. The following description of exemplary interfaces and accompanying methods are provided by way of disclosure.

| IMFTopoLoader Interface |
|---|
| interface IMFTopoLoader : IUnknown<br>   { HRESULT SetTopologyCallback(IMFTopologyConnectionCallback* pTopoCallback, DWORD dwFlags );<br>      HRESULT SetPreferredSampleDuration( LONGLONG llSampleDuration );<br>      HRESULT Load( IMFTopology * pInputTopo, IMFTopology ** ppOutputTopo );<br>   };<br>      SetTopologyCallback( IMFTopologyConnectionCallback* pTopoCallback, DWORD dwFlags ); |

This method permits an application 202 to specify a "smart" connector callback to the topology loader 232. This "smart" connector gives the application the flexibility to influence the topology loader 232 during the process of constructing a topology. By way of example, the application may be given the chance to connect two nodes before the topology loader 232 attempts to connect the nodes. Alternatively the application may have the ability chance to create a certain DMO (DirectX Media Objects) before the topology loader 232 attempts to create the DMO.

Load(IMFTopology*pIn, IMFTopology**ppOut, IMFTopology* pCurrentTopo)

Given an input partial or loaded topology, this method turns converts the partial topology into a fully loaded topology. This method locates the intermediate transforms needed to provide a fully specified pipeline of sources, transforms, and sinks, and sets all the input and output media types on all the objects in the topology. If this method returns successfully, the output topology is ready for processing by the media processor or another processor.

In an exemplary implementation the third parameter pCurrentTopo can be NULL or a pointer to the preceding topology. If pCurrentTopo is specified, then it will be used for object caching, which is described in greater detail below. The objects in the output topology may be the same objects in the input topology. If the Load method completes successfully, then the input topology may be discarded.

| IMFSampleDurationSetter Interface |
| --- |
| interface IMFSampleDurationSetter : IUnkuown<br>{HRESULT SetPreferredSampleDuration(LONGLONG<br>llSampleDuration );<br>}; |

SetPreferredSampleDuration(LONGLONG llSampleDuration);

This method may be used by an application to specify preferred sample duration. Smaller sample duration may be specified to provide lower latency, while bigger sample duration may be specified to provide better quality. In an exemplary implementation llSampleDuration is in 100 ns data units.

CallBack Interface: IMFTopologyConnectionCallback:

In an exemplary implementation topology loader 232 comprises a callback interface that permits an application such as application 202 to influence the topology loader 232 during the process of resolving a topology. Exemplary scenarios in which this callback feature may be useful include:

Codecs: An Application could have knowledge of certain codecs which it does not want to be used or is known as buggy. The callback feature offers a way for the application to reject a codec. An application may also have knowledge of certain codecs which it prefers to use. The callback feature offers a way for the application to specify preferred codecs.

User Specified DMOs: For transform nodes, the application 250 is allowed to specify a guid on the topology node in the partial topology. Since the application's DMO may potentially be a not a real COM object (i.e., cannot be instantiated through CoCreateInstance) or might require some setup and initialization on creation, the callback should offer the application an opportunity to instantiate its DMO itself.

Topology Loader Override: In some instances an application may need to completely override the topology loader 232. For example, in some cases, there may be domain specific negotiations between two components of which the topology loader 232 has no knowledge. The callback feature permits an application to override the topology loader 232 in a connection and allows the application to resolve the partial topology.

Compatibility Problems: Certain components are known to have problems with certain media types even though they accept them By way of example, some video renderers may accept a media type but have problems rendering it. The callback feature permits an application to have some control on the media types used with the components it uses.

| NotifyDMOCreation Method |
| --- |
| HRESULT NotifyDMOCreation ( const CLSID* pGuidDMO,<br>TOPOID NodeID,  IUnknown ** pDMOUnk ); |

A partial topology received by the topology loader may have transform nodes which do not have the objects instantiated. In this case the nodes contain the guid of the required DMOs and the topology loader creates it using CoCreateInstance. Since a user-specified transform may not be a COM object, or the application may want to set some setting to the DMO before it is used, the topology loader will first call the topology callback method if it exists with this notification.

Return Codes:

S_OK: The application has created the DMO and returned it in pDMOUnk. The topology loader will attach this DMO to the node and continue.

S_FALSE: Topology loader will create the DMO itself the normal way.

Any other Error Code: An unexpected error has occurred. The topology loader will abort with this error.

| NotifyConnectingNodes Method |
| --- |
| HRESULT NotifyConnectingNodes( IMFTopology* pTopology,<br>IMFTopologyNode* pUpNode, long lOutIndex, IMFTopologyNode*<br>pDownNode, long lInIndex ); |

The topology loader may call this method whenever it attempts to resolve the connection between two nodes in the partial topology. The connection may require any combination of decoders, encoders, color converters, etc. to be added inbetween.

This method may give the application an opportunity to do the work on one of the connections (instead of the topology loader) to enforce the applications specific requirements. The application has two possible approaches: it can either set the preference types it wants on one or both sides of the connection, or it can make the connection itself.

In the first approach, the application only needs to set the preference type on the side of the connection it cares about. The application has to guarantee that the type it sets is acceptable to that component. The topology loader will only use that type when working with this component next. The application will have to realize that some components might be marked unconfigurable if they are components repeated from a previous topology that is currently running. This means that the type on the object should not be changed.

After the application sets the types, it returns an HRESULT of S_TOPO_TYPES_SET, (or another code that indicates that it only set the preferred types).

In the second approach the application may implement the following steps: First, the application will need to discover the type of objects it is connecting by getting the Node type from each of the nodes. The application may need to connect each possible object according to its interface. The application may connect sources, DMOs, splitters, multiplexers, tees, or sinks. Typically the application does not need to understand all of these since in most cases the application probably only cares about a specific connection it wants to handle. For all others it can return E_NOTIMPL indicating that it does not handle connecting this connection.

Second, the application needs to negotiate the media types between the two nodes. The application should take care not to change the type of any node marked as unconfigurable. The application may decide whether any intermediate nodes are necessary.

Third, the application may Insert any intermediate components it decides are necessary to complete this connection by creating new nodes for them, adding these nodes to the topology and setting the components and their guids to the nodes.

Fourth, the application should connect all nodes together and configure all components media types.

Fifth, the application should Return S_OK to indicate that it has completed work on this connection and the topology loader can pass on to the next one.

If the application fails to resolve the connection and wants the topology loader to attempt this, it should clean up all nodes it added to the topology and all connections it made and then return E_NOTIMPL.

Return Values:
S_OK: Indicates that the application has done all the work. The Topology loader will move on to next connection to resolve
MF_S_TOPO_TYPES_SET: Indicates that the application has set preferred types on the nodes, and wants the topology loader to continue resolving this connection
E_NOTIMPL: Indicates that the application is not interested in this connection. The topology loader continues normally
Any other error code: Indicates that the application returned an unexpected failure. The topology loader will fail returning this error.

| NotifyCodecCreation Method |
| --- |
| HRESULT NotifyCodecCreation (CLSID* pGuidDMO, CLSID* pDMOCategory, TOPOID NodeID, BOOL bLastChance); |

Parameters:

| |
| --- |
| pGuidDMO: Guid of Codec about to be created.<br>pDMOCategory: One of the following values<br>DMOCATEGORY_VIDEO_ENCODER<br>DMOCATEGORY_AUDIO_ENCODER<br>DMOCATEGORY_VIDEO_DECODER<br>DMOCATEGORY_AUDIO_DECODER |

NodeID: ID of upstream node whose output is being decoded or downstream node in the case of encoding.
bLastChance: Set to true when this is the last codec available.
Return Values:
S_OK: Indicates that the application has not problem with this codec.
MF_F_TOPO_CODEC_REJECTED: Application rejects this codec.
Any Other Error: Indicates an unexpected application problem.
NotifyMediaTypeConsidered Method
HRESULT NotifyMediaTypeConsidered (IMFMediaType*pMediatype, IMFTopologyNode*pNode, long lIndex, bool boutput);
Parameters:
pMediaType: MediaType being considered by topology loader pNode: Node Containing component from which the topology loader received this type.
lIndex: Index of Node's connection for which the topology loader got this type
bOutput: True if this is the node's output connection, false if input
Return Values:
S_OK: Indicates that the media type is accepted.
MF_E_TOPO_MEDIATYPE_REJECTED: Indicates that the application rejects this media type.
MF_S_TOPO_MEDIATYPE_IGNORE: Indicates that the application does not care about this particular connection.

In an exemplary implementation, this notification is triggered in the following circumstances:

A) When connecting two uncompressed nodes: It would be called for every media type received from the upstream node, and every media type received from the downstream node. The application could restrict the working set and the topology loader may use the remaining types to determine which media type to apply. Thus the notification does not mean the system is definitely going to use this media type, but that it may, so this is the application's opportunity to reject it.

B) When connecting uncompressed to uncompressed with no input types (e.g., a Video Renderer): This method is called with every media type imposed on the downstream node C) When Connecting Compressed to Compressed: This method is called for every media type tried between the upstream and downstream nodes, e.g., when connecting them directly without decoding and re-encoding.

This method will not notify the application of media types between sources and decoders, encoders and sinks, or internal inserted components such as the media types the topology loader uses for the color converter and resizer etc.

NotifyReceivedPartialTopo Method
HRESULT NotifyReceivedPartialTopo (IMFTopology*pPartialTopo);
Parameters:
pPartialTopo: a pointer to the new partial topology received by the topology loader for resolution
Return Values:
S_OK: Indicates that the application has made the changes it needs to the partial topology, and the Topology loader may proceed with resolving the topology. It is possible that the application could have left the topology unchanged.
AnyErrorCode: Indicates that an unexpected error occurred.

This notification is triggered whenever the Load method is called on the topology loader and gives the application access to the partial topology right before it is resolved. The application can add or remove nodes or configure components already present in the topology. The application may also need this just to gather some information from the topology. It is the application's responsibility not to change the partial topology in an incorrect way causing the resolution to fail.

IMFFopoServices Interface
Overview

This interface is implemented by the media session object 230. The media session 214 is the object which creates the topology loader 232. The topology loader's lifetime is the same as that of the media session 214 so any settings set to topology loader 232 though this interface will remain active though the life of the media session 214. This interface provides topology services such as setting the callback interface to the topology loader and other topology-related services which require knowledge of the current state of the media processor 230 (e.g., what is the current topology).

The IMFTopoServices interface is accessed by the application through an IMFGetService interface implemented on the media engine object 220. The application will get the IMFGetService by QIng the media engine 208. Then application calls IMFGetService::GetService with the guid MF_TOPO_SERVICE and IID_IMFTopoServices. The call is forwarded by the media engine 208 to the media session 214 which returns a pointer to this interface. The form of the IMFFopoServices Interface is as follows:

```
Interface IMFTopoServices: IUnknown
{
  HRESULT   SetTopologyCallback(
      IMFTopologyConnectionCallback* pTopoCallback,
      DWORD dwFlags );
  HRESULT GetCurrentFullTopology( IMFTopology** ppFullTopo );
  HRESULT  SetFullTopology   (  IMFTopology*   pFullTopo,
      BOOL bNeedsResolution );
}
```

Method Descriptions

| SetTopologyCallback Method |
| --- |
| HRESULT SetTopologyCallback( IMFTopologyConnectionCallback* pTopoCallback, DWORD dwFlags ); |

This method is the same as the one defined for IMFTopoloader above. It forwards the call to the topology loader 232.

| GetCurrentFullTopology Method |
| --- |
| HRESULT GetCurrentFullTopology( IMFTopology** ppFullTopo ); |

Parameters:

ppFullTopo: Returns the current full topology.

This method will return a pointer to a clone of the current full topology which is running in the media processor 230. Since the cloned nodes will still have reference to the actual objects, the application has the responsibility not to make changes, such as changing the types on the components, as these changes might disrupt the media processor's operation.

The application may use this to either gather information about the current topology, or make changes to the topology and reset it using the next method.

| SetFullTopology Method |
| --- |
| HRESULT SetFullTopology ( IMFTopology* pFullTopo, BOOL bNeedsResolution ); |

Parameters:

pFullTopo: New Topology to be set to the media processor. Usually this will be a topology obtained through GetCurrentFullTopology and modified.

bNeedsResolution: TRUE if the application has modified the topology in a way which requires it to be re-resolved in the topology loader before being set to the media processor. If it is set to false, the topology will be set as is to the media proc.

Internal Interfaces and Methods

In an exemplary implementation topology loader 232 provides internal interfaces and methods used to convert partial topologies to full topologies. Exemplary interfaces and accompanying methods are as follows:

Connecting Nodes

ConnectNode(IMFTopologyNode*pNode)

The Load method initially adds all the source nodes to a FIFO queue, then calls the ConnectNode interface for each of the nodes in the queue until the queue is empty.

The ConnectNode interface handles every output of a node individually. The ConnectNodes method is called with the current node and the node that should be connected to the output of the current node. If a reference to the previous full topology exists, then ReconnectNodes is called instead of ConnectNodes to attempt to use preconfigured components from the old topology.

| ConnectNodes Method |
| --- |
| ConnectNodes( IMFTopologyNode* pUpNode, long lOutIndex, IMFTopologyNode* pDownNode, long lInIndex) |

This method connects one output on an upstream node to one input on the downstream node. This method implements logic to determine whether the upstream and downstream nodes are compressed, and inserts intermediate components as necessary to deal with compression. Once a connection is established with the downstream node, the downstream node is examined to determine if all its inputs are connected. If so, then the downstream node is added to the end of the FIFO queue. Operations implemented by the ConnectNodes method are described in greater detail in connection with FIG. 5.

ConnectUnCompToUnComp Method

This method gets all output types of an upstream node and stores them in an array. Video and audio types without a MFVideoFormat or MFAudioFormat structure attached for Video and Audio types are rejected.

This method also gets all input types of downstream node and stores them in array. Video and audio types without an MFVideoFormat or MFAudioFormat structure attached for Video and Audio types are rejected.

If there are no input types on the downstream node, then all output types are tried on the downstream node until it accepts one. If the downstream node rejects all output types and is video, then connect to color converter and try all output types of color converter on downstream node. This is the path taken when connecting to a Video Renderer.

If both the upstream node and downstream node have specified types, then an attempt is made to match the types.

GoFromUnCompToComp/GoFromCompToUnComp Methods

These two methods are similar, except that one is on the decoding side, and the other on the encoding side. These methods use a MF Transform Enumerator to find the Decoder/Encoder needed according to the type that needs to be decoded or encoded to. If no MF Transform is found, then it attempts to use the acm/icm codecs.

The nodes are then connected, and in the case of encoding the input type of the encoder is determined and set on that input, to be used in ConnectUnCompToUnComp.

ReconnectNodes Method

This method is called instead of ConnectNodes to connect two nodes with the help of previously created components that are in the previous old topology. If it fails, then ConnectNodes is called, and the code path proceeds normally.

Managing Topology Changes

In an exemplary implementation the topology loader 232 is configured to manage topology changes which may occur during, e.g., a transition in media play back or a change in media types or media sources.

Regarding media types, a component in a topology (e.g., a splitter, demultiplexer, or a DMO) may change its output format while the topology is running. In this event the particular node must reconnect to all the downstream components in the topology, while updating their media types to the new one.

For example, assume a topology is sourcing from a DV camera. The DV splitter can change the output type of its audio while running from 44.1 KHz, 12 bit audio stereo audio to 44.1 KHz, 16 bit stereo audio. The audio renderer has to be informed of this change, and if it cannot handle the new media type, then a new object that can convert that media type (such as an audio resampler) should be added to the topology.

Figure 4A:
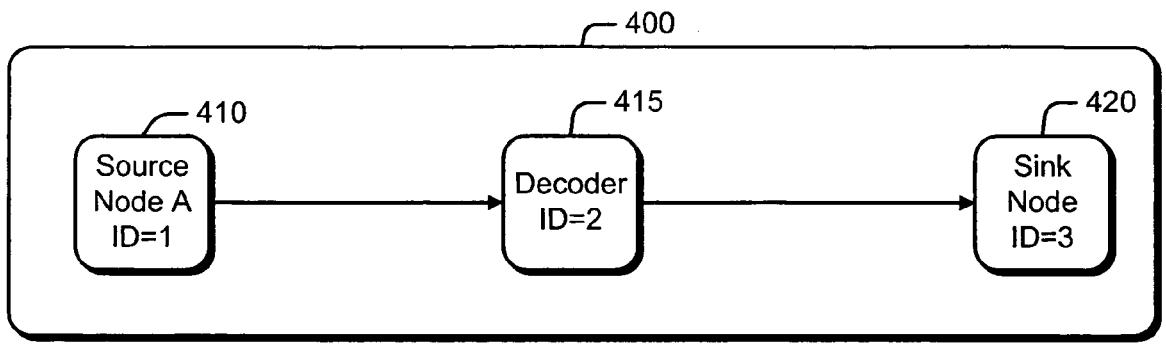
FIGS. 4A-4C are schematic illustrations of exemplary media topologies.
Figure 4B:
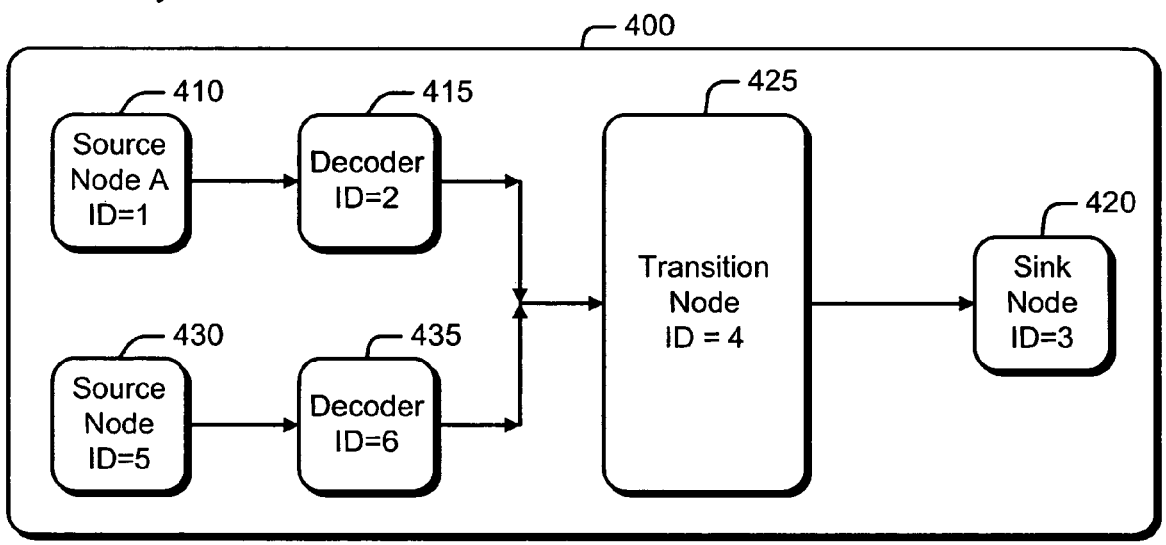
Figure 4C:
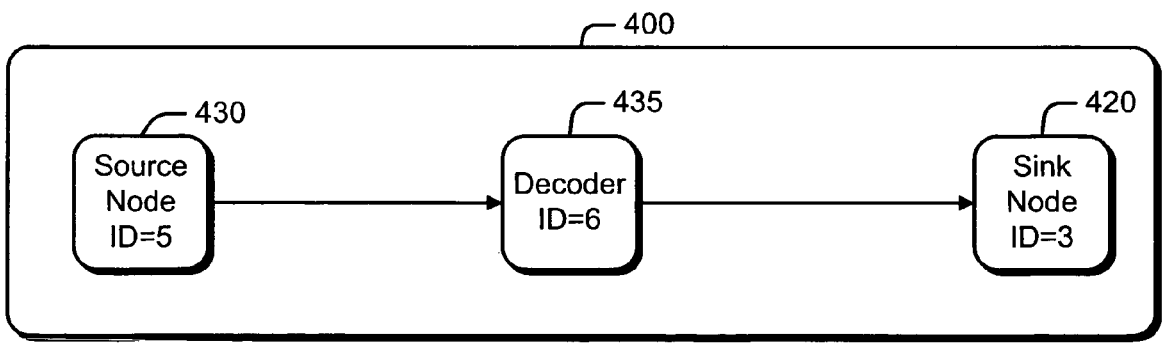

Regarding changes in media sources, FIGS. 4A-4C illustrate an exemplary topology change for transitioning from a first media source to a second media source.

FIG. 4A illustrates an exemplary topology 400 at a first point in time. Topology 400 includes a source node 410, a decoder 415, and a sink node 420. The particular nature of the respective nodes is not critical; also, it will be appreciated that the topology may include additional nodes. In an exemplary implementation source node 410 may be an .asf media source, decoder 415 may be a decompressor, and sink node 420 may be a video output node.

FIG. 4B illustrates the topology 400 at a second point in time during a transition from a first media source to a second media source. A second source node 430 and decoder 435 have been introduced into the topology 400. In addition, a transition node 425 may be added to transition from source node 410 to source node 430. In an exemplary implementation transition node 425 may be implemented as a demultiplexer, which switches from source node 410 to source node 430 at an appropriate period in time.

FIG. 4C illustrates the topology 400 at a third point in time after the transition from a first media source to a second media source. Topology 400 includes source node 430, decoder 435, and sink node 420.

It will be apparent that source node 410 is repeated in the topology illustrated in FIG. 4A and FIG. 4B, while source node 430 is repeated in the topology illustrated in FIG. 4B and FIG. 4C. In a media source transition it is desirable to use the same instance of a decoder with the same media source across the topology transition. By way of example, it is desirable to ensure that the same instance of decoder 415 is used in FIG. 4A and FIG. 4B (e.g., to ensure that the buffer information and state information in the decoder may be maintained as the topology is transitioned). For similar reasons, it is desirable to ensure that the same instance of decoder 435 is used in FIG. 4B and FIG. 4C.

In one implementation the topology loader implements operations to support dynamic topology changes, i.e., topology changes that take place during media operations, in a seamless fashion. These operations are explained in greater detail below.

Object Caching

In an exemplary implementation the topology loader 232 implements object caching techniques to ensure that the same decoder instance is used if a source node is re-used in a subsequent topology. By way of example, the topology loader 232 may maintain a table of decoders that contains references to all the decoders used in the previously-loaded topology.

The table of decoders is indexed by the ID of the source node with which the decoder is associated. This allows the topology loader to enforce an association between source nodes and decoders, i.e., to ensure that a given source node will always be associated with the same instance of a decoder.

In operation, whenever the topology loader 232 needs to attach a decoder to a source node, it first searches the decoder table for a decoder associated with the source node ID. If the decoder is found in the decoder table, then this decoder is inserted instead of instantiating a new one.

By way of example, Table 1 illustrates an exemplary decoder table corresponding to the topology illustrated in FIG. 4A.

TABLE 1

| Decoder ID | Source Node ID |
|---|---|
| 2 | 1 |

When constructing the topology depicted in FIG. 4B, the topology loader 232 will first reference the decoder table by source node ID. Thus, when source node 410 is inserted into the topology depicted in FIG. 4B, the instance of decoder 415 identified by ID 2 may be inserted into the topology depicted in FIG. 4B, rather than instantiating a new decoder.

Table 2 illustrates an exemplary decoder table corresponding to the topology illustrated in FIG. 4B.

TABLE 2

| Decoder ID | Source Node |
|---|---|
| 2 | 1 |
| 6 | 5 |

When constructing the topology depicted in FIG. 4C, the topology loader 232 may first reference the decoder table by source node ID. Thus, when source node 430 is inserted into the topology depicted in FIG. 4B, the instance of decoder 435 identified by ID 6 may be inserted into the topology depicted in FIG. 4B, rather than instantiating a new decoder.

Similarly, the topology loader 232 may also maintain a table of encoders that contains references to the encoders used in the previously-loaded topology. The encoder table need not be indexed by the ID of the output node, as the output nodes could be switched or a tee could be inserted. In operation, whenever the topology loader needs to insert an encoder into a topology, the topology loader searches the encoder table for an encoder which has an output type that matches the media type requested by the media sink. If an encoder is found, then the topology loader 232 uses the located encoder rather than instantiating a new encoder.

In an exemplary implementation the topology loader 232 may be configured to use an existing full topology as a cache from which it may obtain components (i.e., objects) with which to build another topology. By way of example, the topology loader 232 may be configured to use the topology of FIG. 4A as a cache from which to obtain components for constructing the topology of FIG. 4B. Similarly, the topology loader 232 may be configured to use the topology of FIG. 4B as a cache from which to obtain components for constructing the topology of FIG. 4C.

Figure 5:
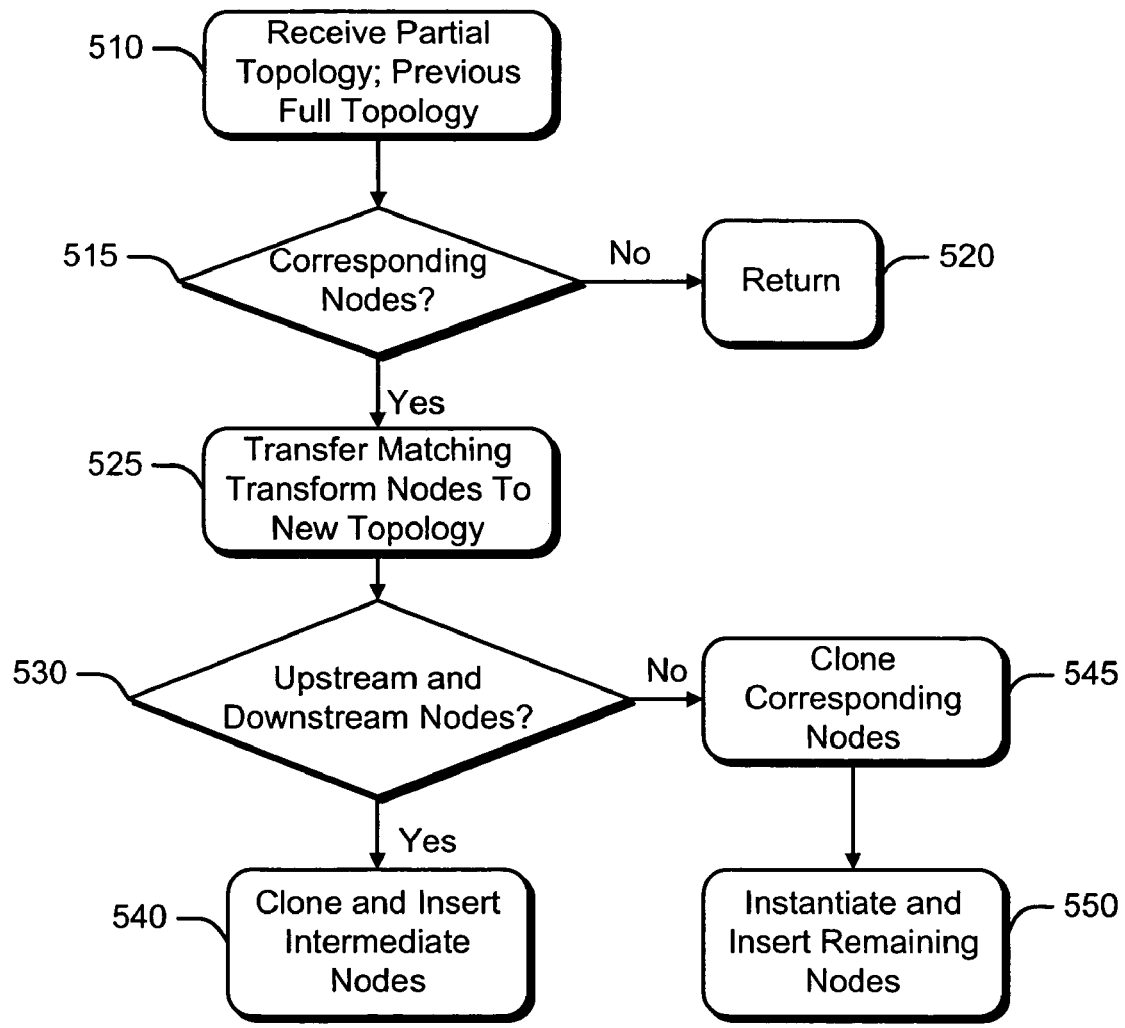
FIG. 5 is a flowchart illustrating exemplary operations executed for managing topology changes in media applications.

FIG. 5 illustrates operations 500 that may be implemented by the topology loader 232 for using an existing topology as an object cache to construct a transition topology. Referring to FIG. 5, at operation 510 the topology loader 232 receives a partial topology and a previous full topology. This may be implemented by passing the existing topology (or a pointer thereto) as a parameter in the Load call, as described above. In an exemplary implementation the Load method accepts three topology pointers: the partial topology to be resolved, the output full topology to be produced, and the current full topology, which may be running and is the last full topology produced by the topology loader 232.

At operation 515 the topology loader determines whether there are corresponding nodes in the partial topology and the previous full topology. In an exemplary implementation this may be performed by comparing the nodes in the partial topology and the previous full topology received as parameters. If there are no corresponding nodes, then control passes to operation 520 and object caching operations 500 terminate. The new topology may then be instantiate using conventional techniques. Exemplary techniques are disclosed in corresponding U.S. patent application Ser. No. 10/796,505, entitled RESOLVING PARTIAL MEDIA TOPOLOGIES, commonly assigned to Microsoft Corporation of Redmond, Wash., USA, the disclosure of which is incorporated herein by reference.

By contrast, if there are corresponding nodes, then control passes to operation 525, and matching transform nodes from the previous full topology are transferred to the new topology. In addition, the transform nodes are marked as non-configurable, indicating that their media type cannot be changed.

If, at operation 530, there are matching upstream and downstream nodes in the partial topology and the previous full topology, then control passes to operation 540 and the topology loader 232 clones and inserts the intermediate nodes between the upstream and downstream nodes. This eliminates the need for media type negotiation for any nodes between upstream node and the downstream node. By contrast, if there are not matching upstream and downstream nodes, then control passes to operation 545 and the topology loader 232 clones matching nodes. Control then passes to operation 550 and the remaining nodes are instantiated and inserted into the full topology using conventional techniques.

It will be understood that the previous full topology received with the load call may still be running in the media processor. Thus, reused components cannot be reconfigured. Instead, the topology loader 232 converts the media stream to the form that the DMO currently takes. Accordingly, nodes in the partial topology which refer to the same nodes in the full topology should be cloned from the full topology, e.g., using the IMFTopologyNode::CloneFrom method.

While the operations of FIG. 5 are concerned with using the previous full topology for object caching, it will be understood that any number of previous topologies could be maintained for object caching. In addition, or in the alternative, only heavily-used components could be maintained for object caching. Increasing the number of topologies or components maintained for caching reduces the time required to construct a full topology but increases the memory requirements of the topology loader, so any specific implementation may select a preferred balance between these competing factors.

Exemplary Operating Environment

Figure 6:
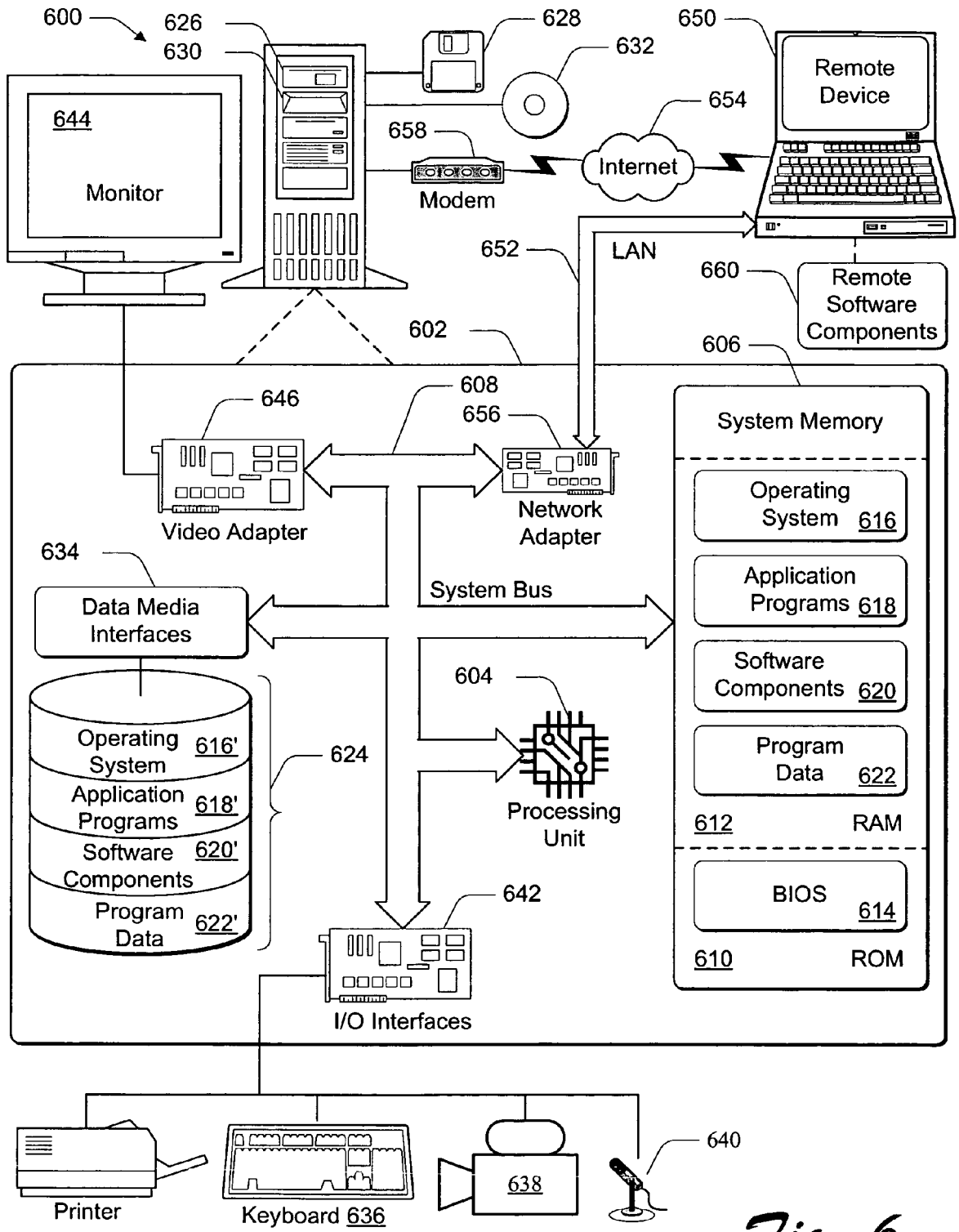
FIG. 6 is an illustration of an exemplary operating environment.

The various components and functionality described herein are implemented with a number of individual computers. FIG. 6 shows components of a typical example of a computer environment 600, including a computer, referred to by reference numeral 602. The computer 602 may be the same as or different from computer 102 of FIG. 1. The components shown in FIG. 6 are only examples, and are not intended to suggest any limitation as to the scope of the functionality of the invention; the invention is not necessarily dependent on the features shown in FIG. 6.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, network-ready devices, minicomputers, mainframe computers, distributed computing environments that include any of the above systems or devices, and the like.

The functionality of the computers is embodied in many cases by computer-executable instructions, such as software components, that are executed by the computers. Generally, software components include routines, programs, objects, components, data structures, etc. that perform particular tasks or implement particular abstract data types. Tasks might also be performed by remote processing devices that are linked through a communications network. In a distributed computing environment, software components may be located in both local and remote computer storage media.

The instructions and/or software components are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 6, the components of computer 602 may include, but are not limited to, a processing unit 604, a system memory 606, and a system bus 608 that couples various system components including the system memory to the processing unit 604. The system bus 608 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 602 typically includes a variety of computer-readable media. Computer-readable media can be any available media that can be accessed by computer 602 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 602. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 606 includes computer storage media in the form of volatile and/or nonvolatile memory such as read only memory (ROM) 610 and random access memory (RAM) 612. A basic input/output system 614 (BIOS), containing the basic routines that help to transfer information between elements within computer 602, such as during startup, is typically stored in ROM 610. RAM 612 typically contains data and/or software components that are immediately accessible to and/or presently being operated on by processing unit 604. By way of example, and not limitation, FIG. 6 illustrates operating system 616, application programs 618, software components 620, and program data 622.

The computer 602 may also include other removable/non-removable, volatile/nonvolatile computer storage media. By way of example only, FIG. 6 illustrates a hard disk drive 624 that reads from or writes to non-removable, nonvolatile magnetic media, a magnetic disk drive 626 that reads from or writes to a removable, nonvolatile magnetic disk 628, and an optical disk drive 630 that reads from or writes to a removable, nonvolatile optical disk 632 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 624 is typically connected to the system bus 608 through a non-removable memory interface such as data media interface 634, and magnetic disk drive 626 and optical disk drive 630 are typically connected to the system bus 608 by a removable memory interface.

The drives and their associated computer storage media discussed above and illustrated in FIG. 6 provide storage of computer-readable instructions, data structures, software components, and other data for computer 602. In FIG. 6, for example, hard disk drive 624 is illustrated as storing operating system 616', application programs 618', software components 620', and program data 622'. Note that these components can either be the same as or different from operating system 616, application programs 618, software components 620, and program data 622. Operating system 616', application programs 618', software components 620', and program data 622'are given different numbers here to illustrate that, at a minimum, they are different copies. A user may enter commands and information into the computer 602 through input devices such as a keyboard 636, and pointing device (not shown), commonly referred to as a mouse, trackball, or touch pad. Other input devices may include source peripheral devices (such as a microphone 638 or camera 640 which provide streaming data), joystick, game pad, satellite dish, scanner, or the like. These and other input devices are often connected to the processing unit 602 through an input/output (I/O) interface 642 that is coupled to the system bus, but may be connected by other interface and bus structures, such as a parallel port, game port, or a universal serial bus (USB). A monitor 644 or other type of display device is also connected to the system bus 608 via an interface, such as a video adapter 646. In addition to the monitor 644, computers may also include other peripheral rendering devices (e.g., speakers) and one or more printers which may be connected through the I/O interface 642.

The computer may operate in a networked environment using logical connections to one or more remote computers, such as a remote device 650. The remote device 650 may be a personal computer, a network-ready device, a server, a router, a network PC, a peer device or other common network node, and typically includes many or all of the elements described above relative to computer 602. The logical connections depicted in FIG. 6 include a local area network (LAN) 652 and a wide area network (WAN) 654. Although the WAN 654 shown in FIG. 6 is the Internet, the WAN 654 may also include other networks. Such networking environments are commonplace in offices, enterprise-wide computer networks, intranets, and the like.

When used in a LAN networking environment, the computer 602 is connected to the LAN 652 through a network interface or adapter 656. When used in a WAN networking environment, the computer 602 typically includes a modem 658 or other means for establishing communications over the Internet 654. The modem 658, which may be internal or external, may be connected to the system bus 608 via the I/O interface 642, or other appropriate mechanism. In a networked environment, program modules depicted relative to the computer 602, or portions thereof, may be stored in the remote device 650. By way of example, and not limitation, FIG. 6 illustrates remote software components 660 as residing on remote device 650. It will be appreciated that the network connections shown are exemplary and other means of establishing a communications link between the computers may be used.

CONCLUSION

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. A method of supporting and dynamically managing media pipeline topology changes during a media application session to facilitate seamless presentation of media during dynamic changes, the method comprising:

accessing a highest priority time source as a main presentation clock to which all clock-aware components synchronize;

receiving a partial media pipeline topology that defines how data flows through a plurality of nodes in the partial media pipeline topology including at least a first media source node and at least a first media sink node;

retrieving a cached media pipeline topology when the partial media pipeline topology is not sufficient to permit presentation to further define how data flows through a plurality of nodes in the partial media pipeline topology including at least a second media source node, at least a second media sink node, and at least one transform node;
cloning one or more nodes including state information from the cached media pipeline topology to the partial media pipeline topology during the media application session thus creating a full media pipeline topology to facilitate the seamless presentation of media;
maintaining a data table that correlates one or more decoders or encoders in the cached media pipeline topology with one or more source nodes or destination nodes in the cached media pipeline topology;
associating a source node with a same instance of a decoder and requiring that the same decoder be used if a media source node is re-used in a subsequent topology or a destination node with a same instance of an encoder and requiring that the same encoder be used if a media destination node is re-used in a subsequent topology;
facilitating the seamless presentation of media by pre-rolling, the pre-rolling comprising receiving data from the first media source node at the first media sink node before the first media sink node starting a presentation clock synchronized with the main presentation clock; and
executing the seamless presentation of media by a computing device.

2. The method of claim 1, wherein the partial media pipeline topology is received from a remote process as a parameter in an interface call.

3. The method of claim 1, wherein the cached media pipeline topology is retrieved as a parameter in an interface call.

4. The method of claim 1, farther comprising determining whether there are corresponding nodes in the partial media pipeline topology and the cached media pipeline topology.

5. The method of claim4, further comprising transferring the at least one transform node from the cached media pipeline topology to the partial media pipeline topology.

6. The method of claim 1, farther comprising cloning a plurality of connected nodes from the cached media pipeline topology to the partial media pipeline topology.

7. The method of claim 1, further comprising connecting one or more nodes in the partial media pipeline topology.

8. The method of claim 7, wherein connecting the one or more nodes in the partial media pipeline topology between the first media source node and the first media sink node comprises generating a data path between an output of a node and an input of an intermediate node.

9. A system comprising:
one or more computer-readable storage media; and
a media engine embodied on the one or more computer-readable storage media and configured to communicatively interact with an application to facilitate seamless presentation of media:
the media engine being configured to communicatively interact with the application to facilitate the seamless presentation of media by using:
a highest priority time source as a main presentation clock to which all clock-aware components synchronize;
a media session configured to;
receive a partial media pipeline topology that defines how data flows through a plurality of nodes in the partial media pipeline topology including at least a first media source node and at least a first media sink node; and
retrieve a cached media pipeline topology when the partial media pipeline topology is not sufficient to permit presentation to further define how data flows through a plurality of nodes in the partial media pipeline topology including at least a second media source node, at least a second media sink node, and at least one transform node; and
a topology loader configured to:
clone one or more nodes including state information from the cached media pipeline topology to the partial media pipeline topology during a media application session thus creating a full media pipeline topology to facilitate the seamless presentation of media;
maintain a data table that correlates one or more decoders or encoders in the cached media pipeline topology with one or more source nodes or destination nodes in the cached media pipeline topology;
associate a source node with a same instance of a decoder and requiring that the same decoder be used if a media source node is re-used in a subsequent topology or a destination node with a same instance of an encoder and requiring that the same encoder be used if a media destination node is re-used in a subsequent topology; and
facilitate the seamless presentation of media by pre-rolling, the pre-rolling comprising receiving data from the first media source node at the first media sink node before the first media sink node staffing a presentation clock synchronized with the main presentation clock.

10. The system of claim 9, wherein the media session passes the partial media pipeline topology to the topology loader as a parameter in an interface call.

11. The system of claim 9, wherein the media session passes the cached media pipeline topology to the topology loader as a parameter in an interface call.

12. The system of claim 9, wherein the topology loader is configured to determine whether there are corresponding nodes in the partial media pipeline topology and the cached media pipeline topology.

13. The system of claim 9, wherein the topology loader is configured to clone one or more intermediate nodes from the cached media pipeline topology, and to connect the one or more intermediate nodes in a communication path between a media source node and a media sink node in a partial media pipeline topology.

14. The system of claim 13, wherein the one or more intermediate nodes comprise a decoder for decoding an output of a source node.

15. The system of claim 13, wherein the one or more intermediate nodes comprises an encoder for encoding an input of a source node.

16. The system of claim 9, wherein the topology loader is configured to maintain a data table that associates one or more decoder nodes with a source node from one or more previous topologies.

17. The system of claim 9, wherein the topology loader maintains a data table that stores one or more encoder nodes from one or more previous topologies.

18. The system of claim 9, wherein the topology loader returns a fully resolved topology to the media session.

19. One or more computer-readable storage media storing computer executable instructions comprising instructions that, when executed on a computer, direct the computer to:
access a highest priority time source as a main presentation clock to which all clock-aware components synchronize;

receive a partial media pipeline topology that defines how data flows through a plurality of nodes in the partial media pipeline topology including at least a first media source node and at least a first media sink node;

retrieve a cached media pipeline topology when the partial media pipeline topology is not sufficient to permit presentation to further define how data flows through a plurality of nodes in the partial media pipeline topology including at least a second media source node, at least a second media sink node, and at least one transform node;

clone one or more nodes including state information from the cached media pipeline topology to the partial media pipeline topology during a media application session thus creating a full media pipeline topology to facilitate seamless presentation of media;

maintain a data table that correlates one or more decoders or encoders in the cached media pipeline topology with one or more source nodes or destination nodes in the cached media pipeline topology;

associate a source node with a same instance of a decoder and requiring that the same decoder be used if a media source node is re-used in a subsequent topology or a destination node with a same instance of an encoder and requiring that the same encoder be used if a media destination node is re-used in a subsequent topology;

facilitate the seamless presentation of media by pre-rolling, the pre-rolling comprising receiving data from the first media source node at the first media sink node before the first media sink node starting a presentation clock synchronized with the main presentation clock; and execute the seamless presentation of media.

20. The one or more computer-readable storage media of claim 19, wherein the partial media pipeline topology is received from a remote process as a parameter in an interface call.

21. The one or more computer-readable storage media of claim 19, wherein the cached media pipeline topology is retrieved as a parameter in an interface call.

22. The one or more computer-readable storage media of claim 19, further comprising computer executable instructions that, when executed on a computer, direct the computer to determine whether there are corresponding nodes in the partial media pipeline topology and the cached media pipeline topology.

23. The one or more computer-readable storage media of claim 19, further comprising computer executable instructions that, when executed on a computer, direct the computer to transfer the at least one transform node from the cached media pipeline topology to the partial media pipeline topology.

24. The one or more computer-readable storage media of claim 19, further comprising computer executable instructions that, when executed on a computer, direct the computer to clone a plurality of connected nodes from the cached media pipeline topology to the partial media pipeline topology.

25. The one or more computer-readable storage media of claim 19, further comprising computer executable instructions that, when executed on a computer, direct the computer to connect one or more nodes in the partial media pipeline topology.

26. The one or more computer-readable storage media of claim 19, further comprising computer executable instructions that, when executed on a computer, direct the computer to generate a data path between an output of an upstream node and an input of a downstream node.

27. A topology loader module comprising computer executable instructions stored in computer-readable storage media that, when executed by a computer, provide:

means for accessing a highest priority time source as a main presentation clock to which all clock-aware components synchronize;

means for receiving a partial media pipeline topology that defines how data flows through a plurality of nodes in the partial media pipeline topology including at least a first media source node and at least a first media sink node;

means for retrieving a cached media pipeline topology when the partial media pipeline topology is not sufficient to permit presentation to further define how data flows through a plurality of nodes in the partial media pipeline topology including at least a second media source node, at least a second media sink node, and at least one transform node;

means for cloning one or more nodes including state information from the cached media pipeline topology to the partial media pipeline topology during a media application session thus creating a full media pipeline topology to facilitate seamless presentation of media;

means for maintaining a data table that correlates one or more decoders or encoders in the cached media pipeline topology with one or more source nodes or destination nodes in the cached media pipeline topology;

means for associating a source node with a same instance of a decoder and requiring that the same decoder be used if a media source node is re-used in a subsequent topology or a destination node with a same instance of an encoder and requiring that the same encoder be used if a media destination node is re-used in a subsequent topology;

means for facilitating the seamless presentation of media by pre-rolling, the pre-rolling comprising receiving data from the first media source node at the first media sink node before the first media sink node staffing a presentation clock synchronized with the main presentation clock; and means for executing the seamless presentation of media.

* * * * *